(12) United States Patent
Farhangdoust et al.

(10) Patent No.: US 11,686,638 B2
(45) Date of Patent: Jun. 27, 2023

(54) PIEZOELECTRIC SENSOR HAVING A MEMBRANE MADE OF AUXETIC METAMATERIAL FOR ENHANCED SENSITIVITY

(71) Applicant: The Boeing Company, Chicago, IL (US)

(72) Inventors: Saman Farhangdoust, Miami, FL (US); Gary E. Georgeson, Tacoma, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/670,431

(22) Filed: Feb. 12, 2022

(65) Prior Publication Data

US 2022/0373415 A1    Nov. 24, 2022

Related U.S. Application Data

(60) Provisional application No. 63/186,070, filed on May 8, 2021.

(51) Int. Cl.
*G01L 9/00*        (2006.01)

(52) U.S. Cl.
CPC ............ *G01L 9/0055* (2013.01); *G01L 9/008* (2013.01)

(58) Field of Classification Search
None
See application file for complete search history.

(56) References Cited

U.S. PATENT DOCUMENTS

| | | | |
|---|---|---|---|
| 6,894,460 B2 | 10/2005 | Clingman | |
| 7,042,888 B2 | 5/2006 | Matsui et al. | |
| 7,127,948 B2 | 10/2006 | Tavares et al. | |
| 7,434,480 B2 | 10/2008 | Georgeson et al. | |
| 7,891,607 B2 | 2/2011 | Piorkowski | |
| 8,084,117 B2 | 12/2011 | Lalvani | |
| 8,344,912 B2 | 1/2013 | Mitchell et al. | |
| 8,397,580 B2 | 3/2013 | Georgeson et al. | |
| 8,448,519 B2 * | 5/2013 | Broden | G01L 13/026 73/717 |
| 8,860,234 B2 | 10/2014 | Hoffman et al. | |

(Continued)

*Primary Examiner* — Andre J Allen
*Assistant Examiner* — Jermaine L Jenkins
(74) *Attorney, Agent, or Firm* — Ostrager Chong Flaherty & Broitman P.C.

(57) ABSTRACT

A piezoelectric sensor includes a substrate, a meta-membrane adhered to the substrate, and a piezoelectric element adhered to the meta-membrane. The substrate includes a support frame which laterally surrounds and partly defines a recess and a cover film which overlies and partly defines the recess. The support frame supports the cover film along an entire periphery of the cover film. The meta-membrane is adhered to the cover film of the substrate. In accordance with one embodiment, the meta-membrane has an auxetic bi-axial kirigami honeycomb structure. In accordance with another embodiment, the meta-membrane has an auxetic hexagonal honeycomb structure. The meta-membrane is adhered to the substrate and to the piezoelectric element using elastic glue. In one proposed implementation, the substrate and meta-membrane are made of polycarbonate and the piezoelectric element comprises a piezoelectric substrate made of polyvinylidene fluoride.

20 Claims, 24 Drawing Sheets

(56) References Cited

U.S. PATENT DOCUMENTS

| | | |
|---|---|---|
| 8,994,528 B2 | 3/2015 | Celik-Butler et al. |
| 9,030,079 B1 | 5/2015 | Roberts et al. |
| 9,107,325 B1 | 8/2015 | Ihn et al. |
| 9,322,685 B2 | 4/2016 | Ray |
| 9,408,163 B2 | 10/2016 | Kessler et al. |
| 9,506,836 B2 | 11/2016 | Pado et al. |
| 10,347,857 B2 | 7/2019 | Matos et al. |
| 10,436,734 B2 | 10/2019 | Smith |
| 10,696,546 B1 | 6/2020 | Perahia et al. |
| 2013/0003620 A1 | 1/2013 | Dame |
| 2018/0073943 A1 | 3/2018 | Zeng et al. |
| 2019/0232598 A1 | 8/2019 | Abbasi et al. |
| 2020/0144431 A1 | 5/2020 | Curtis et al. |
| 2021/0399203 A1* | 12/2021 | Farhangdoust ...... H10N 30/302 |

* cited by examiner

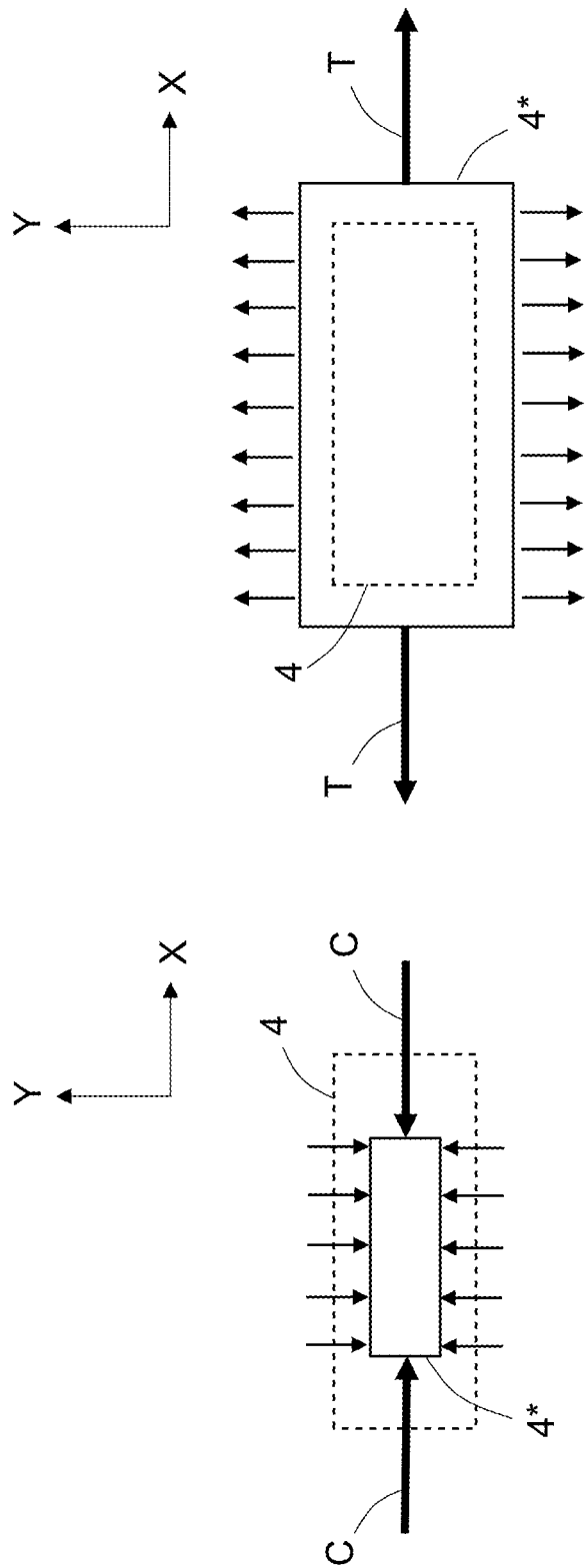

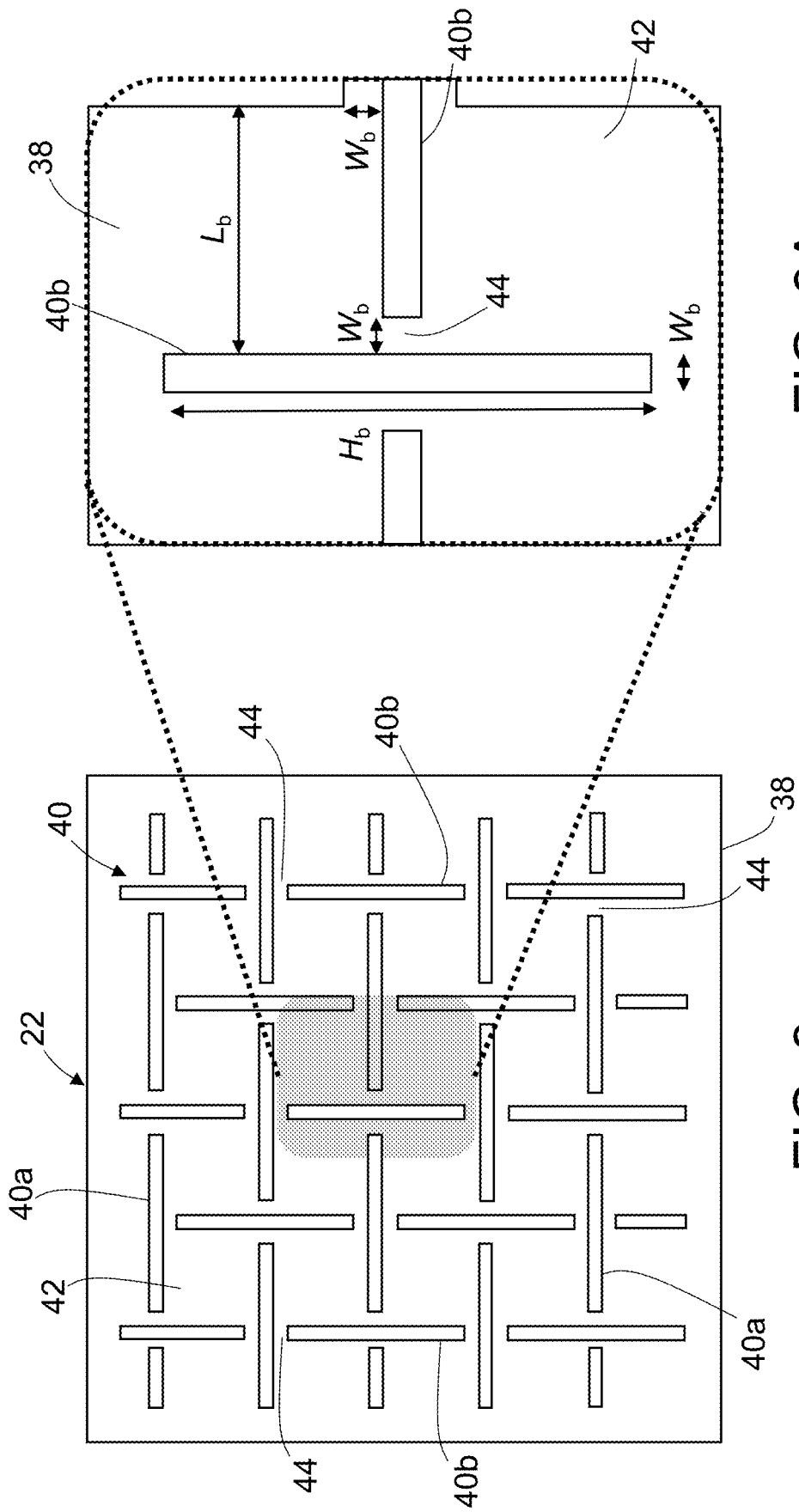

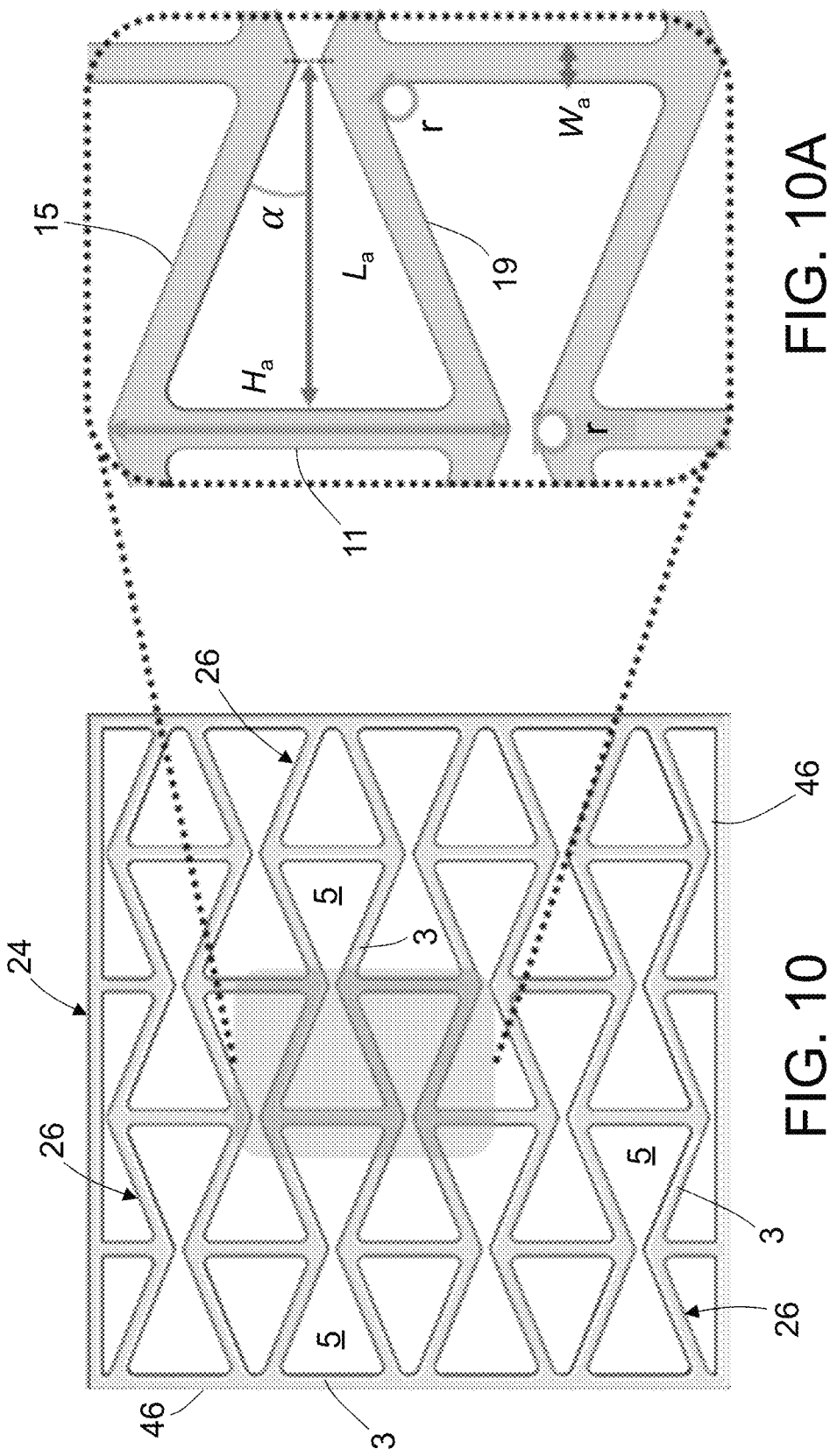

PIEZOELECTRIC SENSOR HAVING A MEMBRANE MADE OF AUXETIC METAMATERIAL FOR ENHANCED SENSITIVITY

RELATED PATENT APPLICATION

This application claims the benefit, under Title 35, United States Code, Section 119(e), of U.S. Provisional Application No. 63/186,070 filed on May 8, 2021.

BACKGROUND

This disclosure relates generally to piezoelectric sensors and, more particularly, to diaphragm-based piezoelectric pressure sensors.

As used herein, the term "diaphragm" means a flexible structure supported (anchored) along its periphery. The flexible structure may include a membrane. A diaphragm may serve as a barrier between two chambers, moving slightly up or down depending on differences in the respective pressures in the chambers. As used herein, the term "plain membrane" means a membrane made of a structure having a positive Poisson's ratio. As used herein, the term "metamaterial" means a material engineered to have a property that is not found in naturally occurring materials. The materials are usually arranged in repeating patterns of microscale elements. Metamaterials derive their properties not from the properties of the base materials, but from their designed structures. As used herein, the term "meta-membrane" means a membrane made of metamaterial.

The low stretchability of plain membranes restricts the sensitivity of conventional diaphragm-based pressure and inflatable sensors. In particular, the low stretchability of non-metamaterial membranes employed in conventional piezoelectric pressure sensors limits the sensitivity of the piezoelectric pressure sensor. There is a need for piezoelectric sensors having enhanced sensitivity.

SUMMARY

The subject matter disclosed in some detail below is directed to piezoelectric sensors having a metamaterial-based membrane (hereinafter "meta-membrane") designed with enhanced stretchability that boosts the polarization of an attached piezoelectric element, and accordingly increases the sensitivity of the sensor. Such meta-membranes may be incorporated in piezoelectric pressure sensors to increase sensitivity. The piezoelectric element converts the applied pressure to electric current, which current may be used to measure the pressure of fluid in contact with the pressure sensor. As used herein, the term "meta-membrane pressure sensor" (MPS) means a piezoelectric pressure sensor that includes a meta-membrane glued to a piezoelectric element.

In accordance with the embodiments disclosed herein, the meta-membrane has either of two metamaterial-based topologies: hexagonal or kirigami. Both embodiments are designed to exhibit auxetic behavior. An auxetic meta-membrane adds the negative Poisson's ratio capability when incorporated in a diaphragm-based piezoelectric pressure sensor. An MPS incorporating a meta-membrane of the types disclosed herein has enhanced multi-directional expansion with an adequate deformation (e.g., flexure) compared to conventional diaphragm-based piezoelectric pressure sensors. An auxetic meta-membrane enhances the mechanical properties/behavior of the MPS by the interplay between materials and specially designed geometries. The meta-membrane stretches the piezoelectric element of the MPS in two directions at once due to its auxetic negative Poisson's ratio. The meta-membrane is more stretchable than a plain membrane and exhibits enhanced strain capacity owing to a topology (either hexagonal or kirigami) that boosts the stress concentrations in the piezoelectric element of the MPS. The creative design of the meta-membrane can improve strain-induced vibration in applications wherein pressure detection sensitivity is dependent on deformation performance. The result is that the mechanical properties of the meta-membrane increase the sensitivity of the piezoelectric pressure sensor.

In accordance with one embodiment, the piezoelectric sensor is a laminate comprising a substrate, a meta-membrane having a hexagonal honeycomb structure, and a piezoelectric element. In accordance with another embodiment, the piezoelectric sensor is a laminate comprising a substrate, a meta-membrane having a kirigami honeycomb structure, and a piezoelectric element. In both cases, the piezoelectric sensor further includes thin layers of elastic glue that bond the substrate to one side of the meta-membrane and bond the piezoelectric element to the other side of the meta-membrane. As used herein, the term "elastic glue" means glue that is able to undergo high strains without adhesive or cohesive failure, such as epoxy or silicone.

The auxetic behaviors of the meta-membranes were demonstrated through finite element simulations which exhibited excellent qualitative and quantitative agreement. The finite element method (FEM) results from theoretical analysis and numerical simulations demonstrated that the meta-membranes may exhibit an extended strain range that enhances the sensitivity of pressure sensors up to 2.96 times more than conventional diagram-based pressure sensors having a plain membrane. The simulation results portend a benefit in sensor applications by contributing to the development of sensitive and efficient pressure sensors using meta-membranes.

Although various embodiments of piezoelectric sensors having an auxetic meta-membrane coupled (e.g., glued) to a piezoelectric element are described in some detail below, one or more of those embodiments may be characterized by one or more of the following aspects.

One aspect of the subject matter disclosed in detail below is a piezoelectric sensor includes a substrate, a meta-membrane adhered to the substrate, and a piezoelectric element adhered to the meta-membrane. The substrate includes a support frame which laterally surrounds and partly defines a recess and a cover film which overlies and partly defines the recess. The support frame supports the cover film along an entire periphery of the cover film. The meta-membrane is adhered to the cover film of the substrate. In accordance with one embodiment, the meta-membrane has an auxetic kirigami honeycomb structure. In accordance with another embodiment, the meta-membrane has an auxetic hexagonal honeycomb structure. The meta-membrane is adhered to the substrate and to the piezoelectric element using elastic glue. In one proposed implementation, the substrate and meta-membrane are made of polycarbonate and the piezoelectric element comprises a piezoelectric substrate made of polyvinylidene fluoride.

Another aspect of the subject matter disclosed in detail below is a pressure measuring system comprising a pressure sensor that includes an auxetic kirigami meta-membrane, a charge amplifier electrically coupled to the pressure sensor, and a measuring device electrically coupled to the charge amplifier. The pressure sensor comprises a substrate, the auxetic kirigami meta-membrane, and a piezoelectric element. The substrate comprises a support frame which laterally surrounds and partly defines a recess and a cover film which overlies and partly defines the recess. The support frame supports the cover film along an entire periphery of the cover film. The meta-membrane is adhered to the cover film of the substrate. The meta-membrane has an auxetic kirigami honeycomb structure. The piezoelectric element is adhered to the meta-membrane.

A further aspect of the subject matter disclosed in detail below is a pressure measuring system comprising a pressure sensor that includes an auxetic hexagonal meta-membrane, a charge amplifier electrically coupled to the pressure sensor, and a measuring device electrically coupled to the charge amplifier. The pressure sensor comprises a substrate, the auxetic hexagonal meta-membrane, and a piezoelectric element. The substrate comprises a support frame which laterally surrounds and partly defines a recess and a cover film which overlies and partly defines the recess. The support frame supports the cover film along an entire periphery of the cover film. The meta-membrane is adhered to the cover film of the substrate. The meta-membrane has an auxetic hexagonal honeycomb structure. The piezoelectric element is adhered to the meta-membrane.

Other aspects of piezoelectric sensors having an auxetic meta-membrane coupled (e.g., glued) to a piezoelectric element are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIGS. 2A and 2B are diagrams showing undeformed and deformed states of a rectangular sheet of a material having negative Poisson's ratio under compression (FIG. 2A) and tension (FIG. 2B) respectively.

FIG. 3A shows the backside of the substrate; FIG. 3B shows the frontside of the substrate.

FIG. 9 is a diagram representing a top view of a model of a meta-membrane having a kirigami topology in accordance with one embodiment.

FIG. 9A is a diagram representing a top view (on a magnified scale) of a portion of the kirigami meta-membrane depicted in FIG. 9.

FIG. 10 is a diagram representing a top view of a model of a meta-membrane having a hexagonal topology in accordance with another embodiment.

FIG. 10A is a diagram representing a top view (on a magnified scale) of a portion of the meta-membrane depicted in FIG. 10.

Reference will hereinafter be made to the drawings in which similar elements in different drawings bear the same reference numerals.

DETAILED DESCRIPTION

For the purpose of illustration, various embodiments of a piezoelectric sensor having an auxetic meta-membrane coupled (e.g., glued) to a piezoelectric element will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Piezoelectric elements are typically adhered to substrates made of materials that have positive Poisson's ratio and contract in the orthogonal direction of applied force. The behavior of a rectangular element made of a material having positive Poisson's ratio under compression and tension is illustrated in FIGS. 1A and 1B respectively.

Figure 1B:
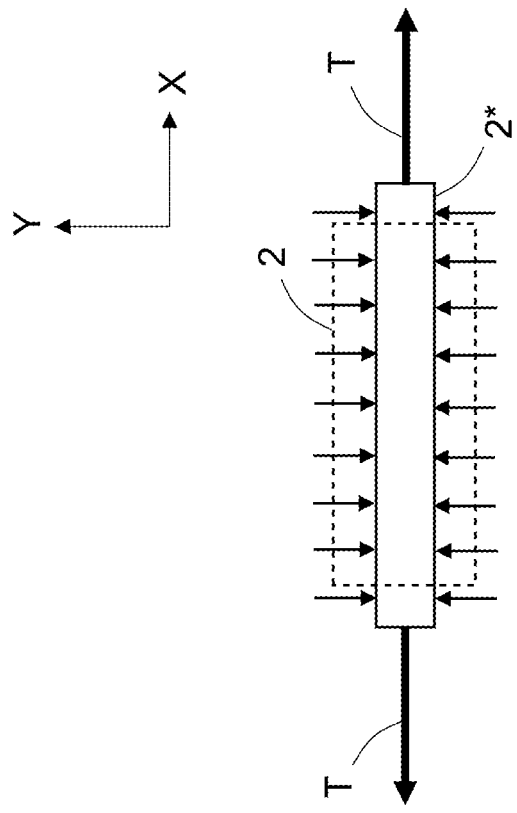
FIGS. 1A and 1B are diagrams showing undeformed and deformed states of a rectangular sheet of a material having positive Poisson's ratio under compression (FIG. 1A) and tension (FIG. 1B) respectively.
Figure 1A:
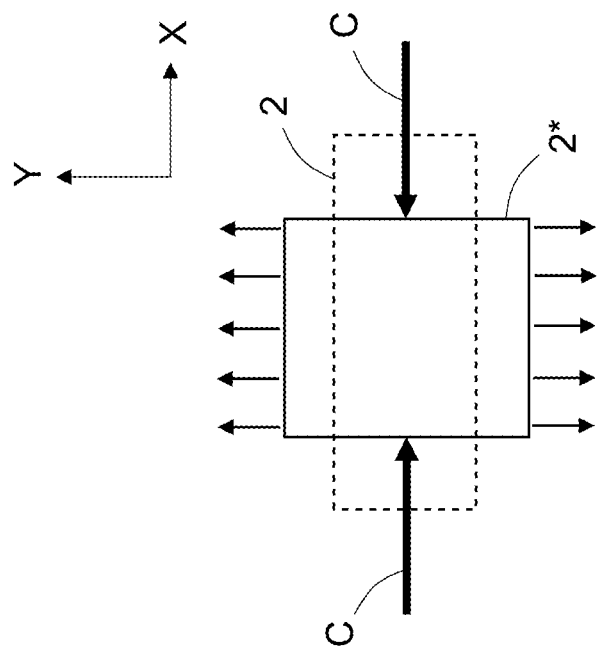

FIG. 1A depicts the undeformed rectangular element 2 (indicated by a dashed rectangle) before an axial compressive force C (indicated by horizontal boldface arrows) is applied. FIG. 1A also depicts the deformed rectangular element 2* (indicated by a rectangle drawn in solid lines) after the axial compressive force C has been applied to opposing ends of the rectangular element. The axial compressive force C is parallel to the X axis. The vertical arrows indicate lateral expansion of the deformed rectangular element 2* in a direction parallel to the Y axis in response to the axial compressive force C. In addition, FIG. 1A shows axial contraction of the deformed rectangular element 2*.

In contrast, FIG. 1B depicts the undeformed rectangular element 2 before an axial tensile force T (indicated by horizontal boldface arrows) is applied. FIG. 1B also depicts the deformed rectangular element 2* after the axial tensile force T has been applied to opposing ends of the rectangular element. The axial tensile force T is parallel to the X axis. The vertical arrows indicate lateral contraction of the deformed rectangular element 2* in a direction parallel to the Y axis in response to the axial tensile force T. In addition, FIG. 1B shows concurrent axial expansion of the deformed rectangular element 2*.

The efficiency of a piezoelectric transducer may be enhanced by applying the piezoelectric element on a substrate made of metamaterial. In particular, auxetic materials have been used to enhance the efficiency of piezoelectric transducers. Auxetic materials display a negative Poisson's ratio. The Poisson's ratio defines the ratio between two characteristics of lateral and axial strains of a structure. The value of Poisson's ratio is the negative of the ratio of lateral (transverse) strain to axial strain:

$$\vartheta = -\frac{\varepsilon_X}{\varepsilon_Y}$$

Such auxetic behavior is found in the hexagonal and bi-axial kirigami honeycombs. The kirigami metamaterial has been developed based on incised periodic and symmetric cuts which are applied to shells and plates to enrich the breaking strain and deformation capacity of the material.

In accordance with the embodiments disclosed herein, piezoelectric elements are adhered to substrates made of metamaterials that have negative Poisson's ratio and expand in a direction orthogonal to the applied force. The behavior of a rectangular element made of a material having negative Poisson's ratio under compression and tension is illustrated in FIGS. 1A and 1B respectively.

FIG. 2A depicts the undeformed rectangular element 4 (indicated by a dashed rectangle) before an axial compressive force C (indicated by horizontal boldface arrows) is applied. FIG. 2A also depicts the deformed rectangular element 4* (indicated by a solid rectangle) after the axial compressive force C has been applied to opposing ends of the rectangular element. Again, the axial compressive force C is parallel to the X axis. The vertical arrows indicate lateral contraction of the deformed rectangular element 4* in a direction parallel to the Y axis in response to the axial compressive force C. In addition, FIG. 2A shows axial contraction of the deformed rectangular element 4*.

In contrast, FIG. 2B depicts the undeformed rectangular element 4 before an axial tensile force T (indicated by horizontal boldface arrows) is applied. FIG. 2B also depicts the deformed rectangular element 4* after the axial tensile force T has been applied to opposing ends of the rectangular element. The axial tensile force T is parallel to the X axis. The vertical arrows indicate lateral expansion of the deformed rectangular element 4* in a direction parallel to the Y axis in response to the axial tensile force T. In addition, FIG. 2B shows concurrent axial expansion of the deformed rectangular element 4*.

Low voltage output and sensitivity are the most important challenges posed by conventional pressure sensors that use diaphragm-based piezoresistive measurement principles. This disclosure proposes meta-membrane pressure sensors (MPSs) which have sensitivities which are higher than the sensitivities of piezoelectric pressure sensors having membranes not made of metamaterial. More specifically, two honeycombs having auxetic hexagonal and biaxial kirigami topologies respectively are exploited to develop a next generation of stretchable meta-membranes for diaphragm-based pressure sensors. To achieve this goal, three pressure sensors using plain and meta-membranes were employed and analyzed in accordance with both theoretical and simulation techniques. First, a pressure sensor comprised of a thin piezo-element bonded to a plain membrane was used as the basis for deriving a computational model that provides the useable frequency range as a function of the natural frequency of the pressure sensor. Then, respective models of the two meta-membranes were utilized to demonstrate sensitivity enhancement of the pressure sensor that depends on the desired stretchability caused by the negative Poisson's ratio behavior of the meta-membranes. The study results provide a foundation for the design of a new class of stretchable meta-membranes that increase sensitivity to pressure.

A conventional diaphragm-based pressure sensor includes three main components: a substrate, a membrane, and a piezoelectric element. The model structure utilized in the simulations described below will be described in detail with reference to FIGS. 3A, 3B, and 4-7. The substrate 10 comprises a support frame 18 which laterally surrounds and partly defines a recess 12 and a cover film 14 which overlies and partly defines the recess 12 (see FIGS. 3B and 6). The support frame 18 supports the cover film 14 along an entire periphery of the cover film 14. The meta-membrane 20 is adhered to cover film 14 of substrate 10 (see FIGS. 4 and 6). The piezoelectric element 30 is adhered to the meta-membrane 20 (see FIGS. 5 and 6).

Figure 3A:
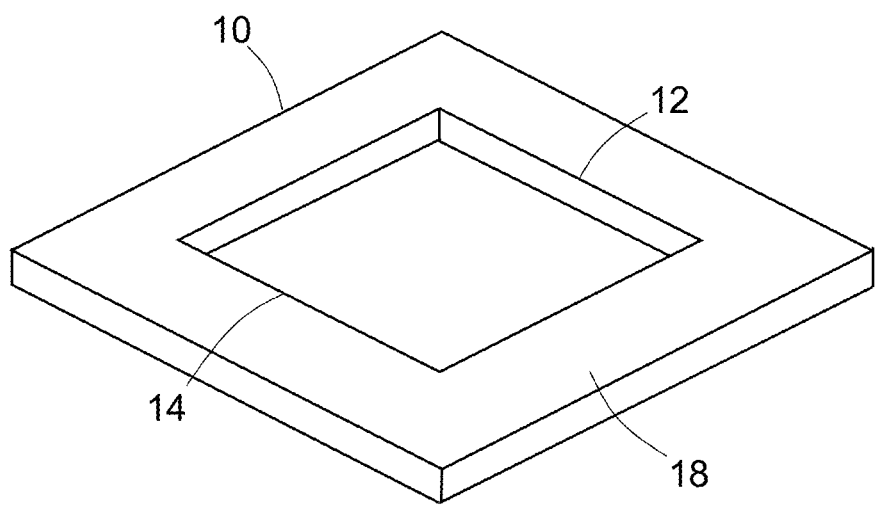
FIGS. 3A and 3B are diagrams representing respective views of a three-dimensional (3-D) model of a substrate designed to be incorporated in a piezoelectric pressure sensor in accordance with one embodiment.
Figure 3B:
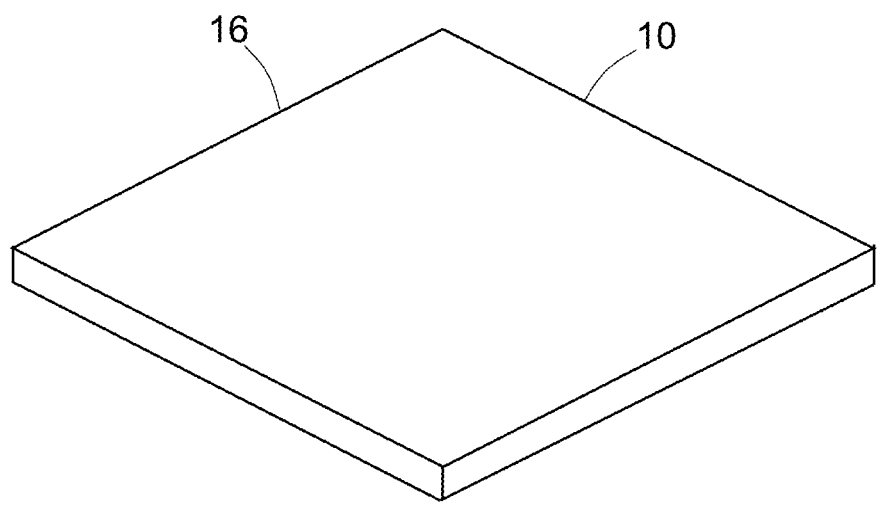

FIGS. 3A and 3B show respective views of a 3-D model of a substrate 10 designed to be incorporated in a piezoelectric pressure sensor in accordance with one embodiment. FIG. 3A shows the backside of the substrate 10; FIG. 3B shows the frontside of the substrate 10. As seen in FIG. 3A, the substrate 10 has a recess 12 punched from the backside or formed during a molding process. The portion of the substrate 10 surrounding and defining the lateral boundary of the recess 12 will be referred to herein as the support frame 18. The support frame 18 supports a central thin portion of substrate 10 which acts as a cover film 14 when a membrane 20 is attached to the surface 16 (see FIG. 3B) on the frontside of substrate 10.

Figure 4:
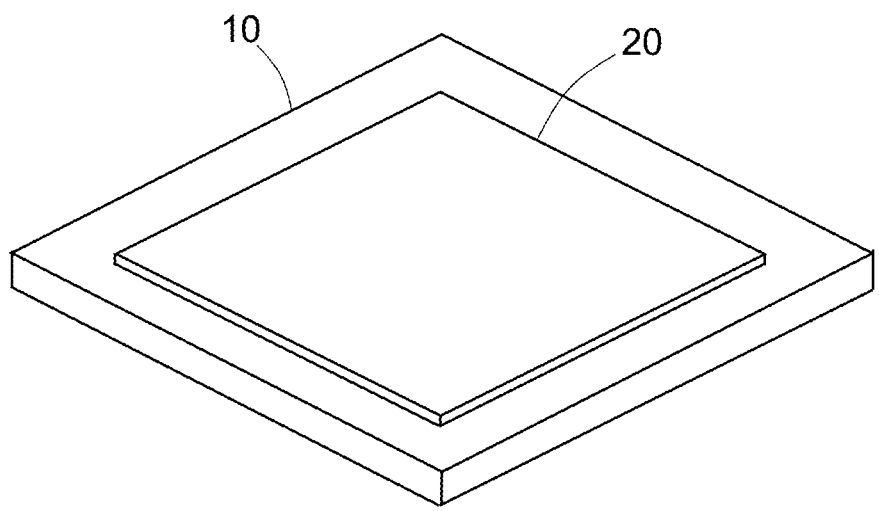
FIG. 4 is a diagram representing a view of a 3-D model of a membrane glued to the frontside of the substrate depicted in FIG. 3B.
Figure 5:
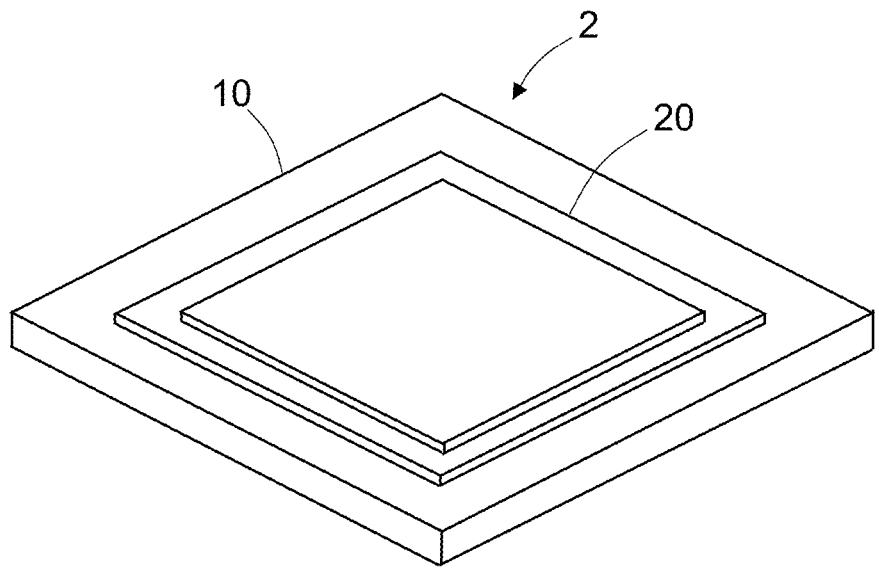
FIG. 5 is a diagram representing a 3-D model of a laminate comprising a membrane glued to a substrate as depicted in FIG. 4 and further comprising a piezoelectric element glued to the frontside of the membrane.

FIG. 4 shows a view of a 3-D model of a membrane 20 that is adhered (e.g., glued) to the surface 16 of substrate 10. FIG. 5 shows a 3-D model of a laminate including the membrane 20 adhered to substrate 10 as depicted in FIG. 4 and further including a piezoelectric element 30 (e.g., a piezoelectric transducer) adhered (e.g., glued) to membrane 20. Thus, membrane 20 is sandwiched between piezoelectric element 30 and cover film 14 to form a laminate. The cover film 14 prevents any direct pressure penetration to the piezoelectric element 30 from the backside of pressure sensor 2. As a result, the strain response of membrane 20 and the stress response of the piezoelectric element 30 were analyzed upon applying a harmonic pressure to cover film 14.

Figure 6:
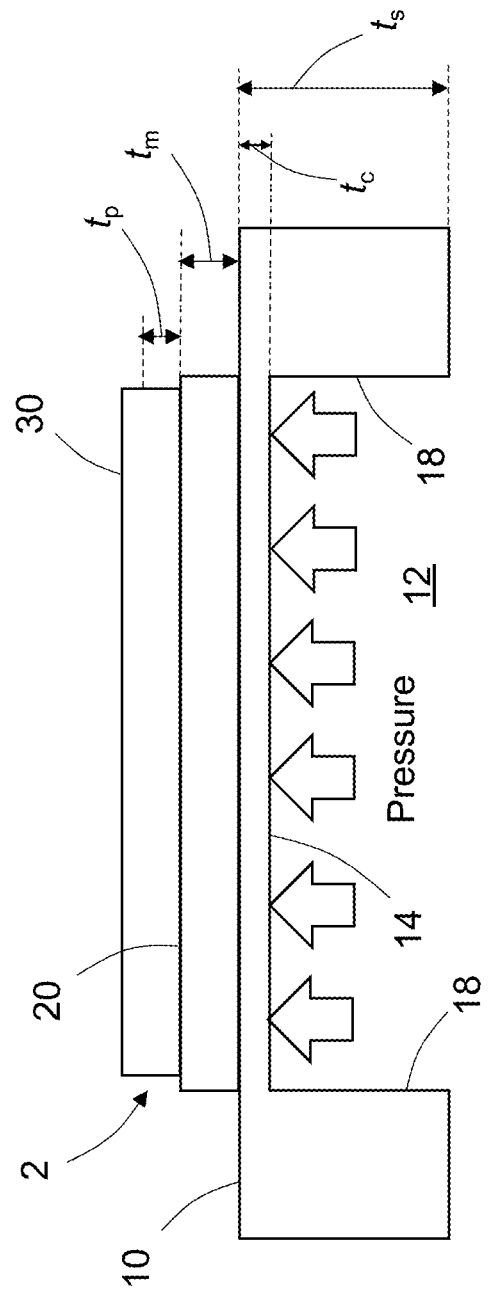
FIG. 6 is diagram representing a cross-sectional view of the laminate model depicted in FIG. 5.
Figure 7:
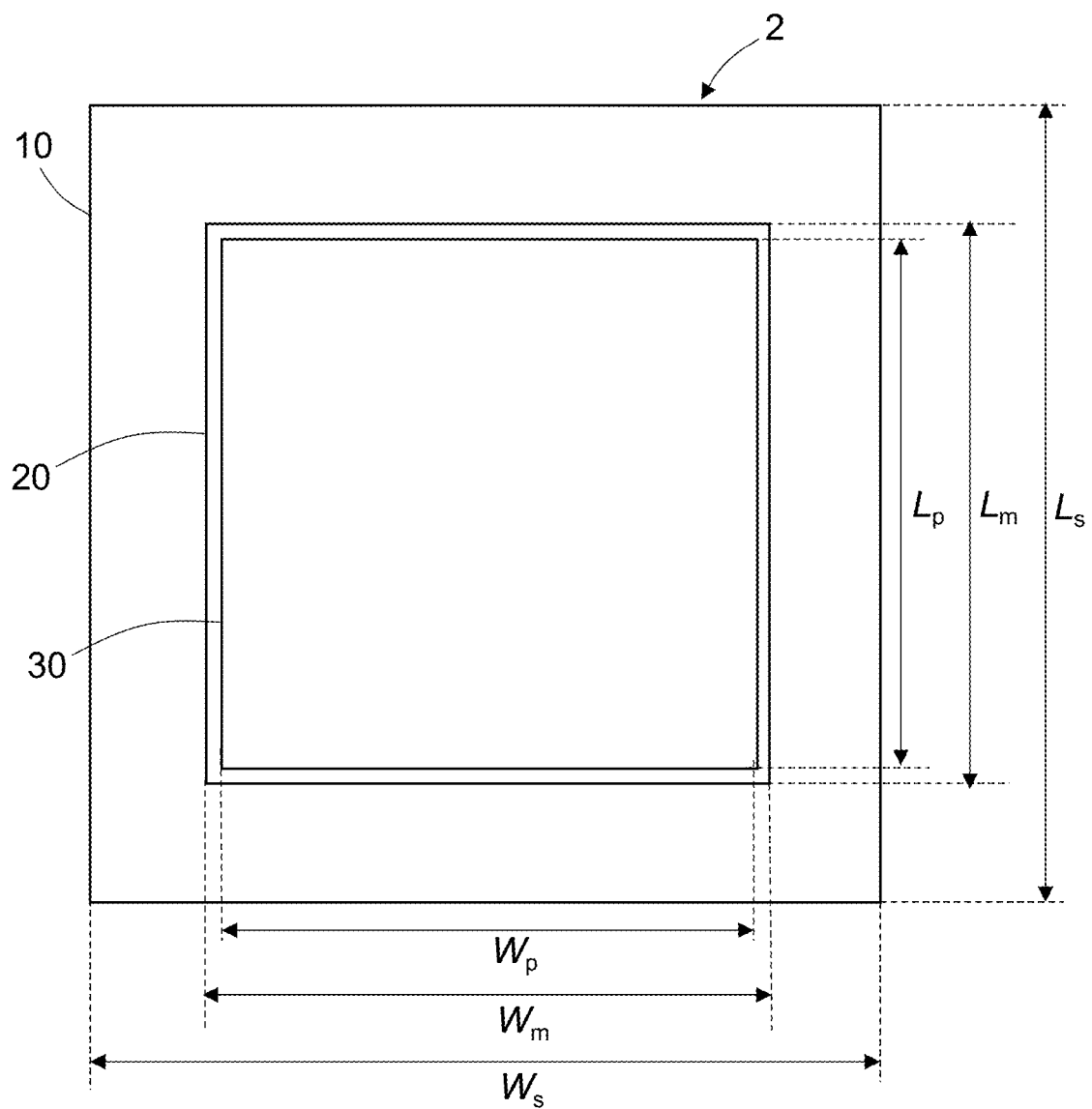
FIG. 7 is a diagram representing a top view of the laminate model depicted in FIG. 5.

FIG. 6 is diagram representing a cross-sectional view of the laminate model depicted in FIG. 5. Various dimensions are indicated in FIG. 6, including: the height (thickness) $t_s$ of substrate 10; the thickness $t_c$ of cover film 14; the thickness $t_m$ of membrane 20; and the thickness $t_p$ of piezoelectric element 30. FIG. 7 is a diagram representing a top view of the laminate model depicted in FIG. 5. Various dimensions are indicated in FIG. 7, including: the width $W_s$ and length $L_s$ of substrate 10; the width $W_m$ and length $L_m$ of membrane 20; and the width $W_p$ and length $L_p$ of piezoelectric element 30.

The dimensions and geometric parameters of the pressure sensor model used in simulations are listed in Table 1. For computational analysis, the material properties of different components of the pressure sensors are listed in Table 2. Polyvinylidene fluoride (PVDF) was selected as a preferable piezoelectric material to use in the piezoelectric element 30 due to its natural flexibility and compatibility. Polycarbonate was selected as the material for both the substrate 10 and the membrane 20.

TABLE 1

Parameter values used in the pressure sensor models

| Part | Parameter | Value | Unit |
|---|---|---|---|
| Substrate | Width $W_s$ | 14 | mm |
|  | Length $L_s$ | 13.5 | mm |
|  | Thickness $t_s$ | 500 | μm |
|  | Cover Thickness $t_c$ | 125 | μm |
| Membrane | Width $W_m$ | 12.125 | mm |
|  | Length $L_m$ | 11.5 | mm |
|  | Thickness $t_m$ | 250 | μm |
| Piezoelectric Element | Width $W_p$ | 11.625 | mm |
|  | Length $L_p$ | 11 | mm |
|  | Thickness $t_p$ | 250 | μm |

TABLE 2

Material properties for models

| Material | Property | Symbol | Value |
|---|---|---|---|
| Piezoelectric Element: Polyvinylidene Fluoride | Density, kg/m³ | $\rho_{PVDF}$ | 1780 |
|  | Load Resistance, kΩ | R | 2000 |
|  | Compliance Matrix, p/Pa | $s_{11}^E$ | 378 |
|  |  | $s_{33}^E$ | 109 |
|  | Coupling Matrix, $10^{-12}$ C/N | $d_{31}$ | 13 |
|  |  | $d_{32}$ | 14 |
|  |  | $d_{33}$ | -33 |
|  | Relative Permittivity | $\varepsilon_{33}$ | 7.6 |
| Substrate and Membrane: Polycarbonate | Density, kg/m³ | $\rho_{PC}$ | ρ(T) |
|  | Poisson's Ratio | $\nu_{PC}$ | ν(T) |
|  | Young's Modulus, GPa | $E_{PC}$ | E(T) |

Figure 8A:
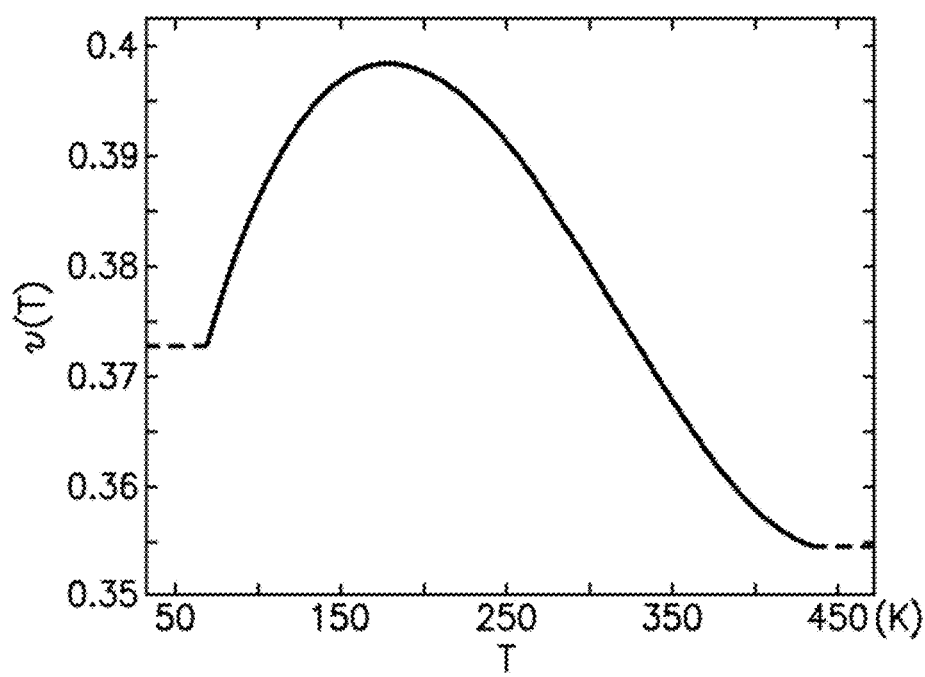
FIGS. 8A-8C are graphs showing Poisson's ratio (FIG. 8A), elastic modulus (FIG. 8B), and density (FIG. 8C) of polycarbonate versus temperature.
Figure 8B:
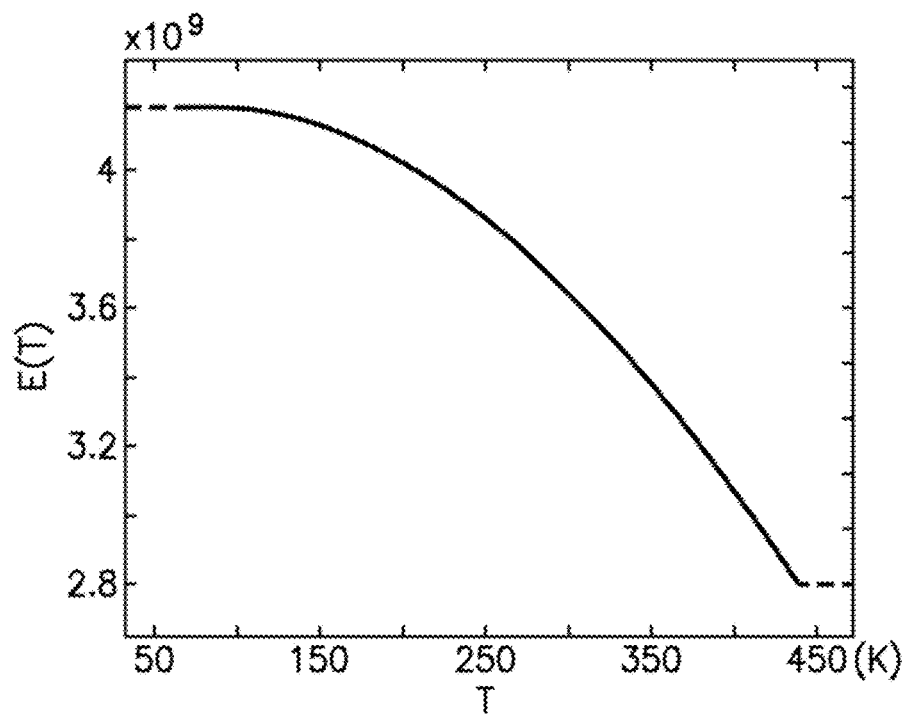
Figure 8C:
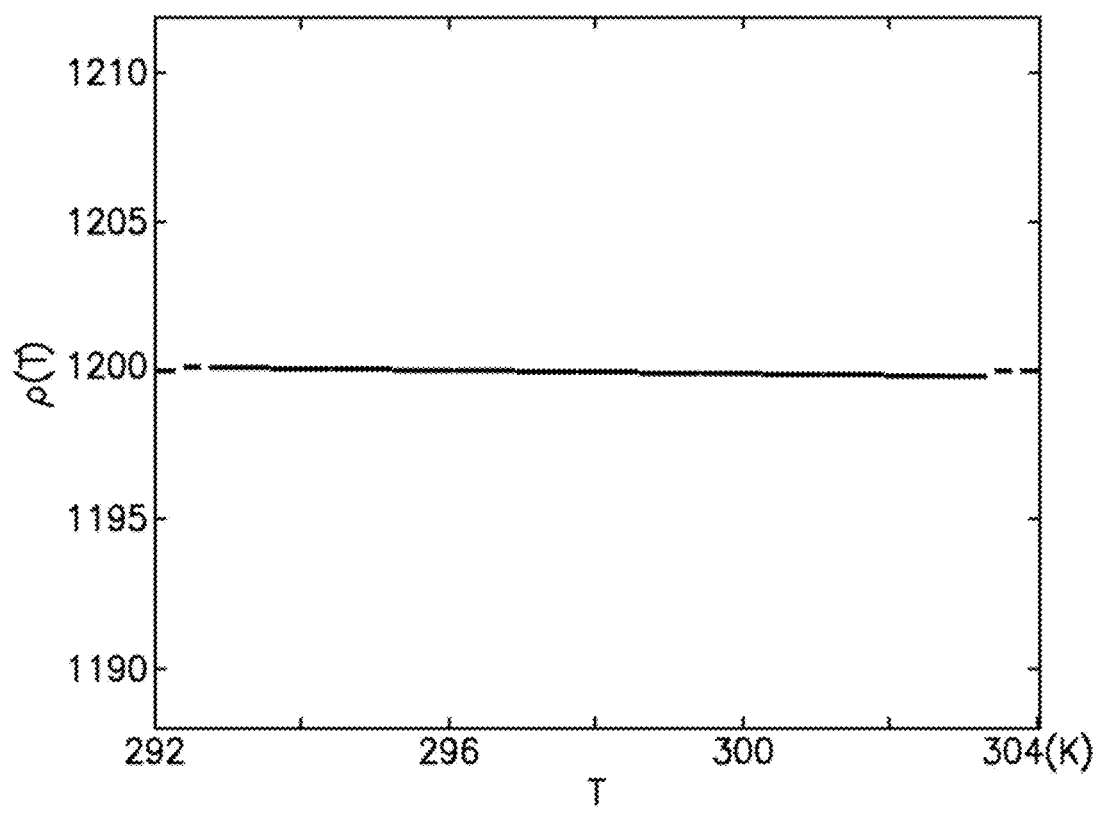

As seen in Table 2, Poisson's ratio ν(T), the elastic modulus E(T), and the density ρ(T) for polycarbonate are functions of temperature. FIGS. 8A-8C are graphs showing Poisson's ratio (FIG. 8A), elastic modulus (FIG. 8B), and density (FIG. 8C) versus temperature (° K) for polycarbonate.

To evaluate the stretchability and sensitivity enhancement enabled by the incorporation of meta-membranes, two distinctive auxetic hexagonal and biaxial kirigami honeycombs (hereinafter "kirigami and hexagonal meta-membranes") were also modeled. The sizes of the kirigami and hexagonal meta-membrane models were the same as the size of the plain membrane model depicted in FIG. 7.

FIG. 9 is a diagram representing a top view of a model of a kirigami meta-membrane 22 having a kirigami topology in accordance with one embodiment. FIG. 9A is a diagram representing a top view (on a magnified scale) of a portion of the kirigami meta-membrane 22 depicted in FIG. 9. The kirigami meta-membrane 22 has an auxetic kirigami honeycomb structure.

In accordance with one embodiment, the kirigami meta-membrane 22 is a perforated sheet 38 of flexible material (polycarbonate was assumed in simulations) with an array 40 of mutually orthogonal elongated narrow openings that form rows and columns of rectangular domains 42 (e.g., square domains). More specifically, the kirigami meta-membrane 22 comprises a perforated sheet 38 of flexible material having a first plurality of mutually parallel (horizontal) elongated narrow openings 40a and a second plurality of mutually parallel (vertical) elongated narrow openings 40b. The first plurality of mutually parallel elongated narrow openings 40a are orthogonal to the second plurality of mutually parallel elongated narrow openings 40b when the perforated sheet 38 is in an unflexed state. The elongated narrow openings may be formed by laser cutting.

As seen in FIG. 9, the perforated sheet 38 comprises a plurality of rectangular domains 42 and a plurality of flexural hinges 44. Each flexural hinge 44 connects one rectangular domain 42 to an adjacent rectangular domain. Each flexural hinge 44 is disposed between a first elongated narrow opening and one end of a second elongated narrow opening which is orthogonal to the first elongated narrow opening. In accordance with one proposed implementation of a piezoelectric sensor, the area of each rectangular domain 42 is square and the area of each flexural hinge 44 is square.

Various dimensions (adopted for the purpose of simulation) of kirigami meta-membrane 22 are indicated in FIG. 9A, including: the width (and length) $L_b$ of each rectangular domain 42; the height $H_b$ and width $W_b$ of each narrow opening; and the width $W_b$ of each flexural hinge. The specific dimensional values employed in simulations are listed in Table 3. However, for the purposes of an actual implementation, there is no requirement that the narrow openings and the flexural hinge have the same width.

Although the planar response of thick sheets with openings cut in a kirigami pattern is characterized by a negative Poisson's ratio, sufficiently thin sheets facilitate the creation of 3-D shapes, such as the formation of a dome in response to pressure.

TABLE 3

Kirigami meta-membrane dimensions of interest

| Parameter | Value | Unit |
|---|---|---|
| $W_b$ | 0.25 | mm |
| $L_b$ | 1.75 | mm |
| $H_b$ | 3.25 | mm |

Figure 10B:
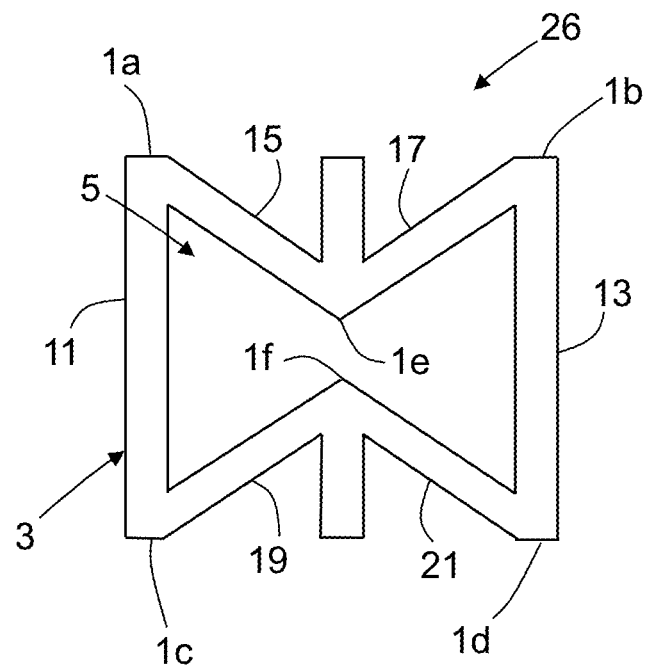
FIGS. 10B and 10C are diagrams representing top views of one cell of the hexagonal meta-membrane depicted in FIG. 10 in unflexed (FIG. 10B) and flexed (FIG. 10C) states, respectively.
Figure 10C:
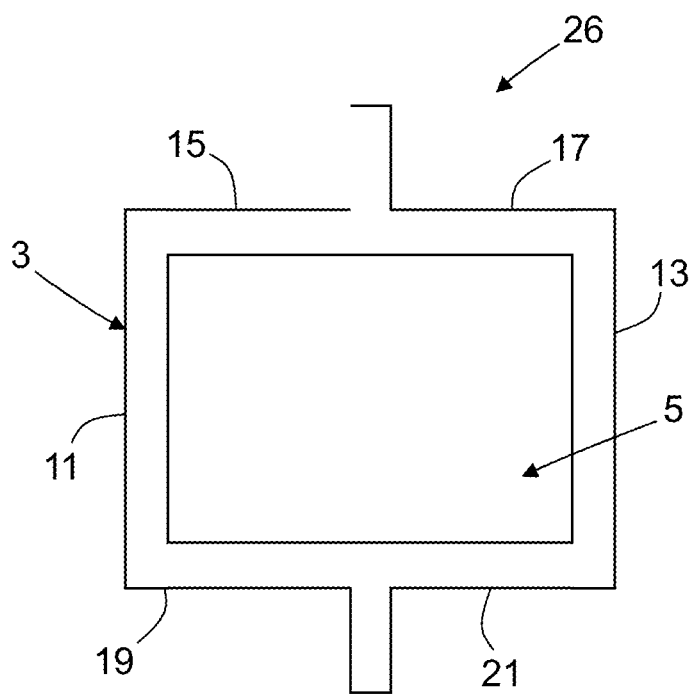

FIG. 10 is a diagram representing a top view of a model of a hexagonal meta-membrane 24 having a hexagonal topology in accordance with another embodiment. FIG. 10A is a diagram representing a top view (on a magnified scale) of a portion of the hexagonal meta-membrane 24 depicted in FIG. 10. In accordance with one embodiment, the hexagonal meta-membrane 24 includes square or rectangular outer frame 46 that supports a network of hexagonal cells 26. Each hexagonal cell 26 includes a deformable hexagonal frame 3 that defines a six-sided polygonal opening 5 which has a bowtie shape when the cell is in the unflexed state depicted in FIG. 10. The hexagonal cells 26 are arranged in rows in which adjacent cells share a common wall. Adjacent rows share common flexible structures described in more detail below with reference to FIGS. 10B and 10C.

Various dimensions (adopted for the purpose of simulation) of hexagonal meta-membrane 24 are indicated in FIG. 10A, including: the height $H_a$ and width $W_a$ of wall; the half-length $L_a$ and half-angle α of each six-sided polygonal opening 5 in the unflexed state; and the radius of curvature r at each flexural hinge. The specific dimensional values employed in simulations are listed in Table 4.

TABLE 4

Hexagonal meta-membrane dimensions of interest

| Parameter | Value | Unit |
|---|---|---|
| $W_a$ | 0.25 | mm |
| $L_a$ | 2.25 | mm |
| $H_a$ | 2.5 | mm |
| r | 0.5 | mm |
| α | 29 | degree |

FIGS. 10B and 10C are diagrams representing top views of one hexagonal cell 26 of the hexagonal meta-membrane depicted in FIG. 10. The hexagonal cell 26 is shown in an unflexed state in FIG. 10B and in a flexed state in FIG. 10C. The hexagonal cell 26 in this example includes a deformable hexagonal frame 3 that defines a six-sided polygonal opening 5 which has a bowtie shape when the cell is unflexed (FIG. 10B) and a rectangular shape when the cell is fully flexed (FIG. 10C).

More specifically, the deformable hexagonal frame 3 comprises walls 11 and 13, a first flexible structure 15/17 which connects wall 11 to wall 13, and a second flexible structure 19/21 which connects wall 11 to wall 13. More specifically, the first flexible structure includes a first flexural element 15 integrally connected to the wall 11 by a first flexural hinge 1a and a second flexural element 17 integrally connected to the wall 13 by a second flexural hinge 1b, while the second flexible structure includes a third flexural element 19 integrally connected to the wall 11 by a third flexural hinge 1c and a fourth flexural element 21 integrally connected to the wall 13 by a fourth flexural hinge 1d. The first and second flexural elements 15 and 17 are connected to each other by a fifth flexural hinge 1e, while the third and fourth flexural elements 19 and 21 are connected to each other by a sixth flexural hinge 1f.

As seen in FIG. 10B, the fifth and sixth flexural hinges 1e and 1f are separated by a gap that is the narrowest point of the six-sided polygonal opening 5 when the hexagonal cell 26 is unflexed. The deformable hexagonal frame 3 is designed such that the size of the gap increases as the walls 11 and 13 move away from each other. As seen in FIG. 10C, the first flexible structure 15/17 and second flexible structure 19/21 are straight and mutually parallel in the fully flexed state. Thus, the mechanical structure depicted in FIGS. 10B and 10C enables the hexagonal cell 26 to manifest auxetic behavior.

A finite element analysis was employed to investigate the sensitivity enhancement provided by the two above-described proposed meta-membranes when incorporated in a piezoelectric pressure sensor. To this end, three pressure sensors were simulated in COMSOL Multiphysics 3.5a software, which pressure sensors respectively included a plain membrane 20, a kirigami meta-membrane 22, and a hexagonal meta-membrane 24. Accordingly, with respect to the stretchability capacity of the membrane and meta-membranes, the voltage output of the three pressure sensors was explored in detail for different design and fabrication parameters, including resonance frequency of the conventional pressure sensor, amplitude as well as frequency of the applied pressure, load resistance of the piezoelectric element 30, and thicknesses of piezoelectric element 30, plain membrane 20, kirigami meta-membrane 22, and hexagonal meta-membrane 24.

Figure 11:
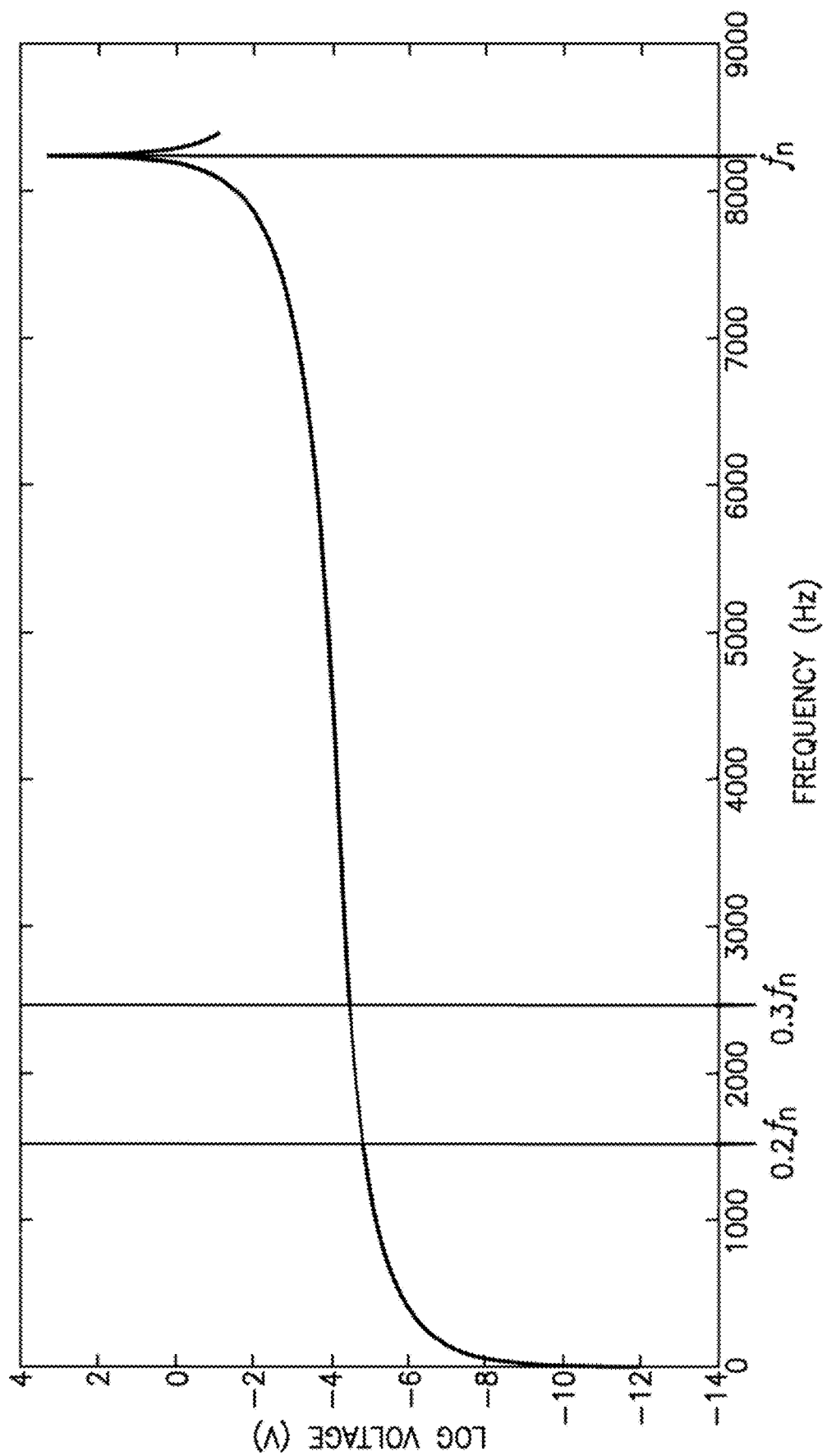
FIG. 11 is a graph of logarithmic voltage versus frequency for a simulated conventional pressure sensor.

FIG. 11 illustrates the logarithmic voltage versus frequency for a conventional piezoelectric pressure sensor. As seen in FIG. 11, the natural frequency occurs at 8240 Hz. There is a point at 20% of the resonance frequency $f_n$ where the sensor's sensitivity rises about 0.5 dB (5%). Similarly, the sensor's sensitivity increases about 1 dB (10%) at 30% of the resonance frequency $f_n$. As a general rule in pressure sensors, the frequency response of a recessed diaphragm system will be useable from 20% to 30% of the resonance frequency $f_n$. Hence, as an indicator for frequency analysis in this computational study, the useable frequency range of the models can be defined between those two points of 0.2 $f_n$ and 0.3 $f_n$, which are 1648 Hz and 2472 Hz, respectively.

Figure 12:
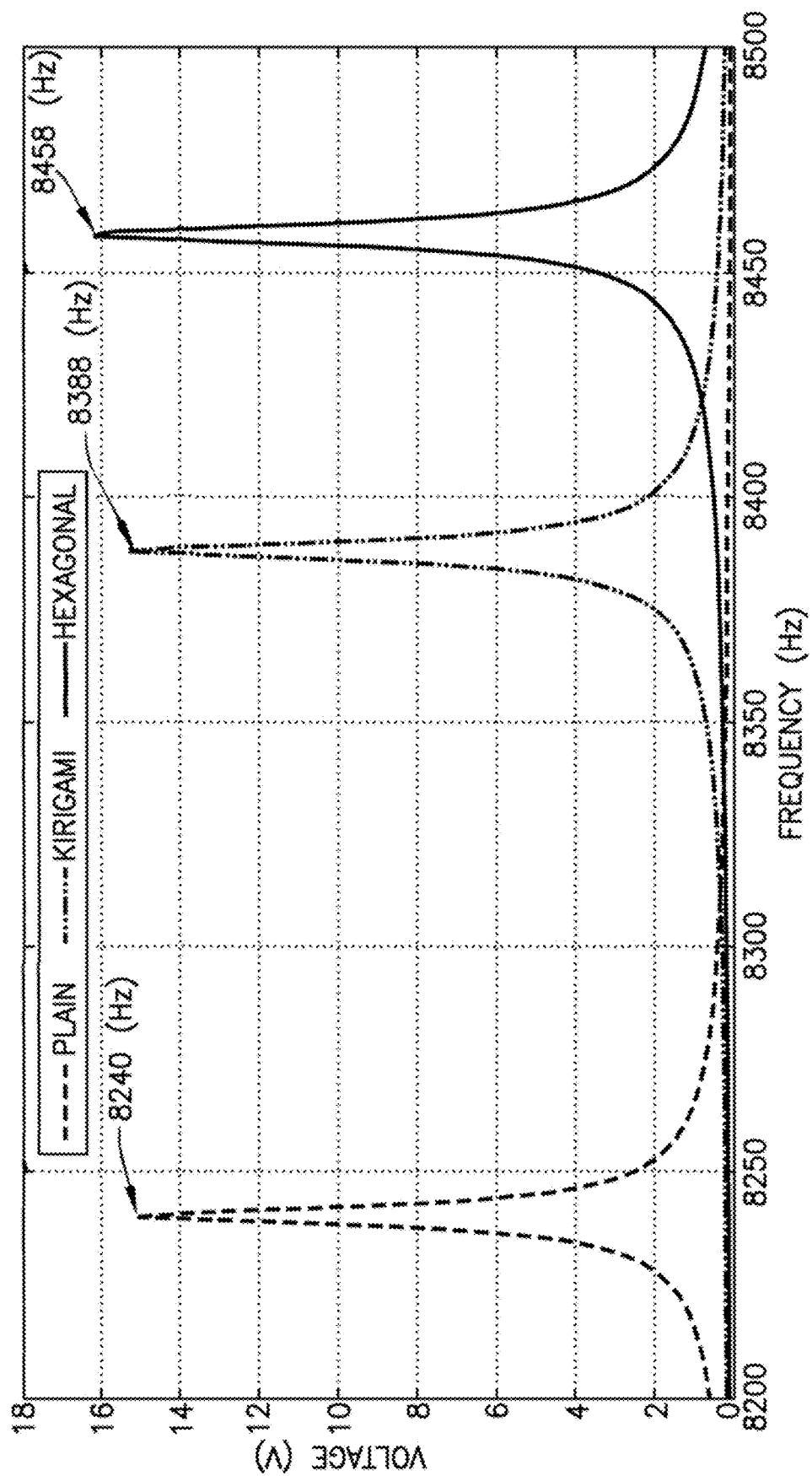
FIG. 12 is a graph of voltage output versus frequency for simulated pressure sensors having a plain membrane (dashed curve), a kirigami meta-membrane (dash-dot curve), and a hexagonal meta-membrane (solid curve). All points used the same excitation of 5 Pa.

FIG. 12 is a graph of voltage output versus frequency for simulated piezoelectric pressure sensors having a plain membrane (dashed curve), a kirigami meta-membrane (dash-dot curve), and a hexagonal meta-membrane (solid curve). All points used the same excitation of 5 Pa. The voltage output generated by the simulation models subjected to a harmonic pressure is shown as the primary stage of electrical characterization. As seen in FIG. 12, the resonance frequencies 8240, 8388, and 8458 Hz, depending on membrane design, are clearly identifiable. According to those resonance frequencies, the hexagonal and kirigami MPS models generated voltage output of 16.2 V and 15.3 V, respectively, which show a voltage enhancement in comparison with the conventional pressure sensor, which generated 15.0 V.

Figure 13A:
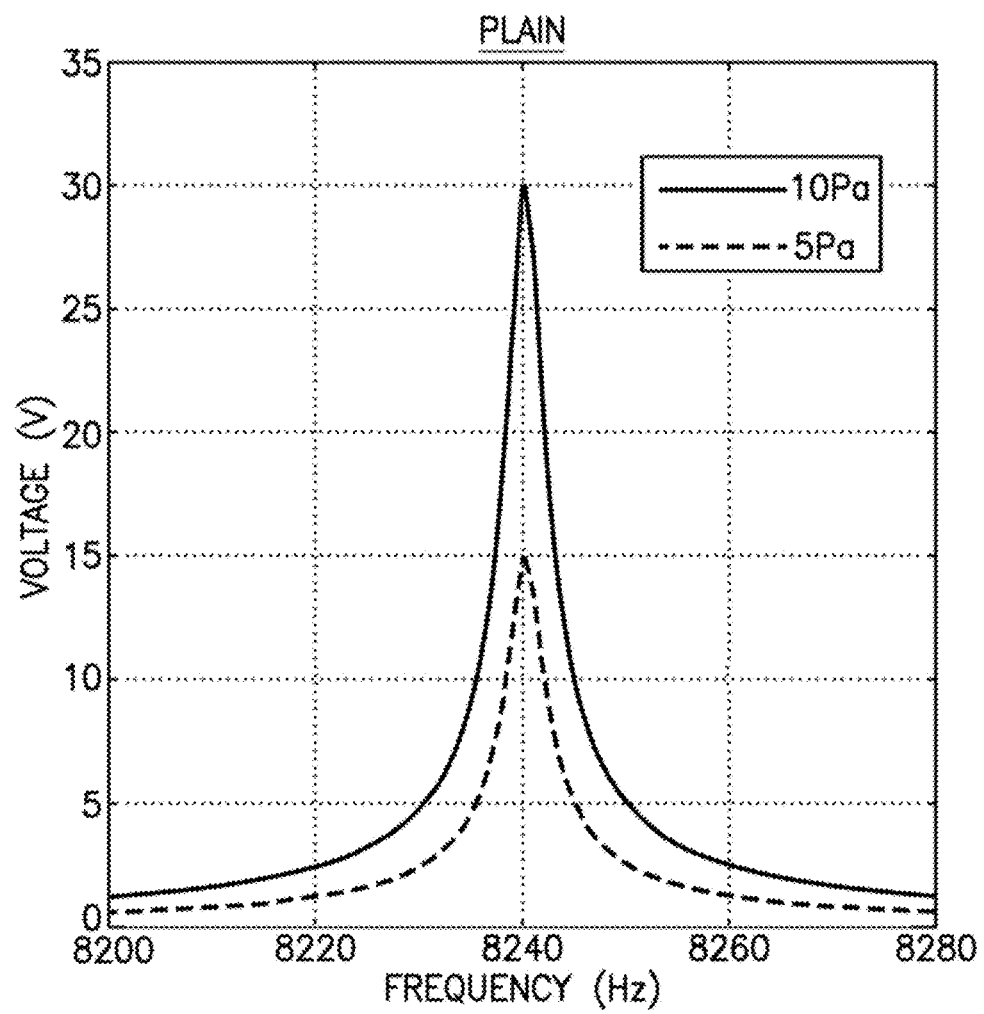
FIGS. 13A-13C are graph of voltage output versus frequency for simulated pressure sensors having a plain membrane (FIG. 13A), a kirigami meta-membrane (FIG. 13B), and a hexagonal meta-membrane (FIG. 13C). All points use the same excitation of 5 Pa (solid curves) and 10 Pa (dashed curves).
Figure 13B:
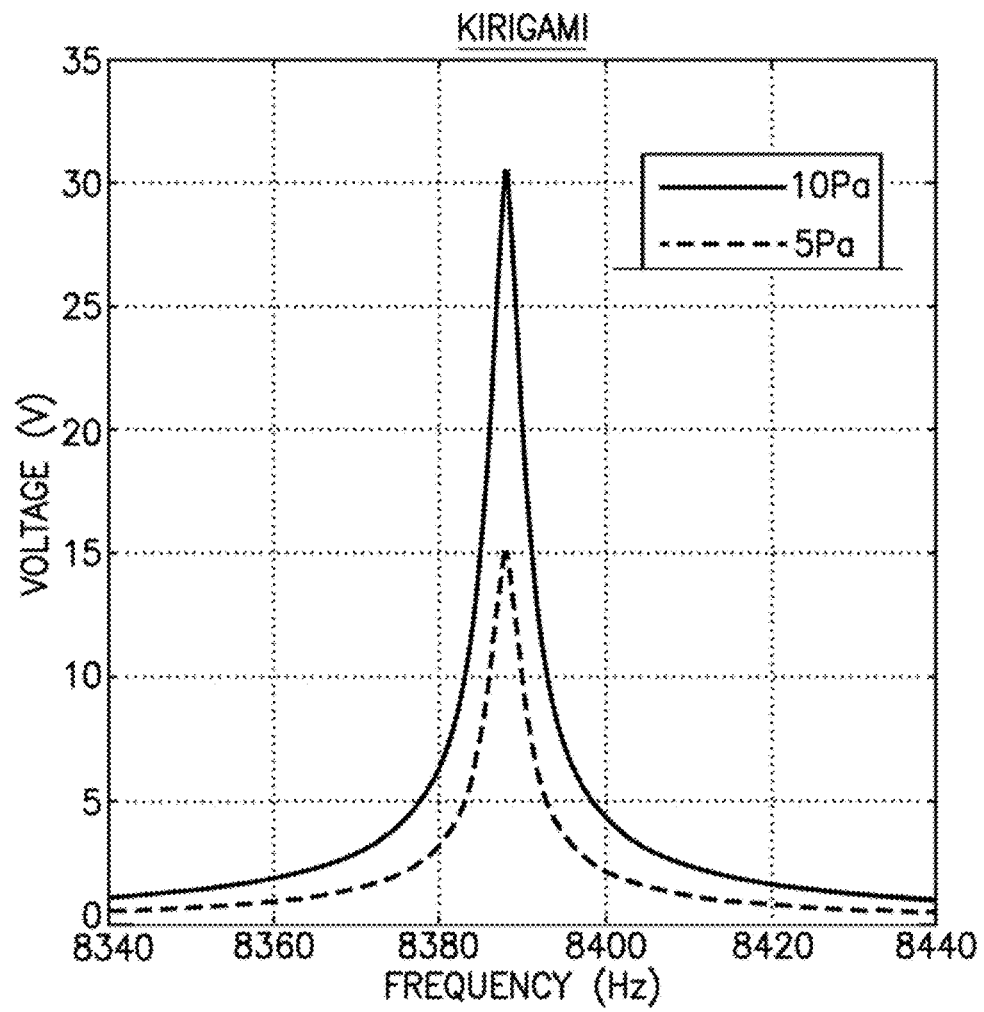
Figure 13C:
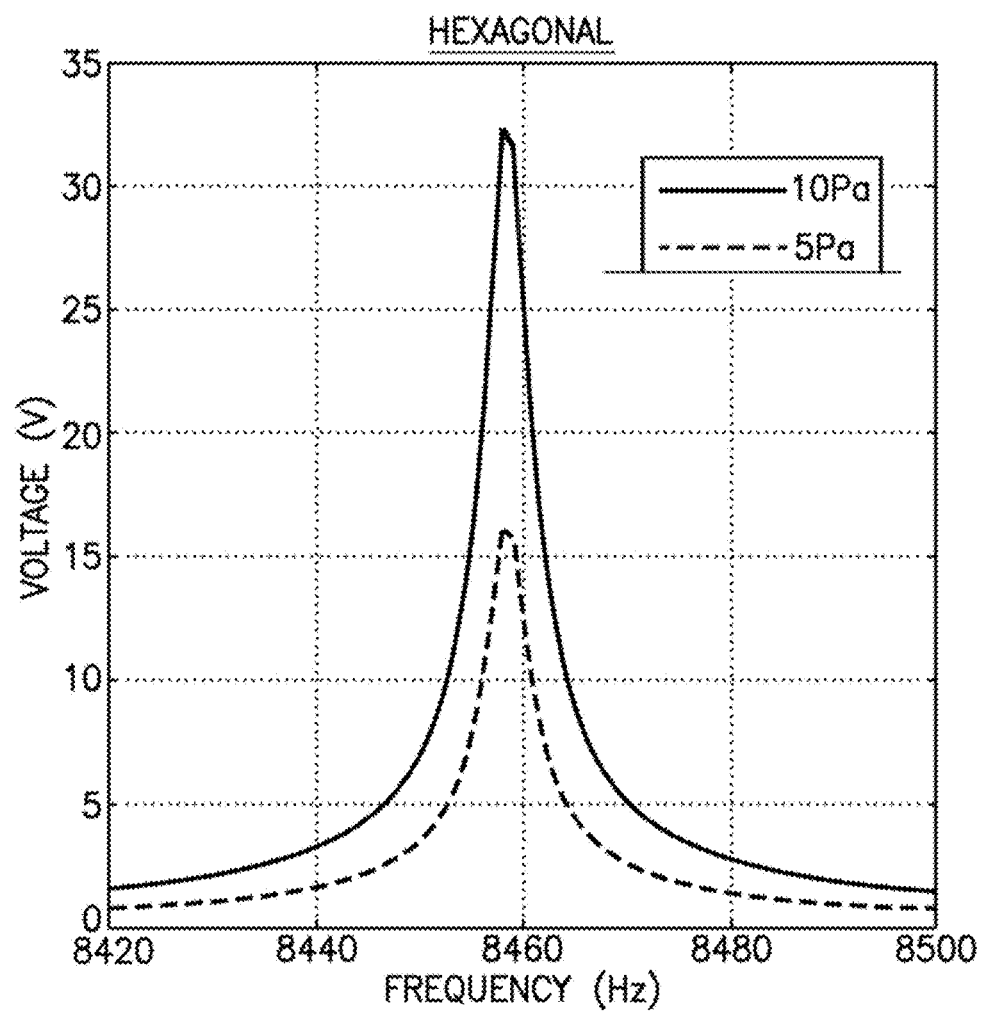

To investigate the effect of applied pressure on the performance of the sensor models, the voltage outputs of three models were simulated when the applied pressure increased by a factor of two (from 5 to 10 Pa). FIGS. 13A-13C are graph of voltage output versus frequency for simulated pressure sensors having a plain membrane (FIG. 13A), a kirigami meta-membrane (FIG. 13B), and a hexagonal meta-membrane (FIG. 13C). One set of data points was derived using a pressure of 5 Pa (solid curves); the other set of data points was derived using a pressure of 0 Pa (dashed curves). These figures clearly show that the voltage output increased when the pressure amplitude increased. Furthermore, the hexagonal MPS provided the best performance at the two simulated pressures.

Figure 14:
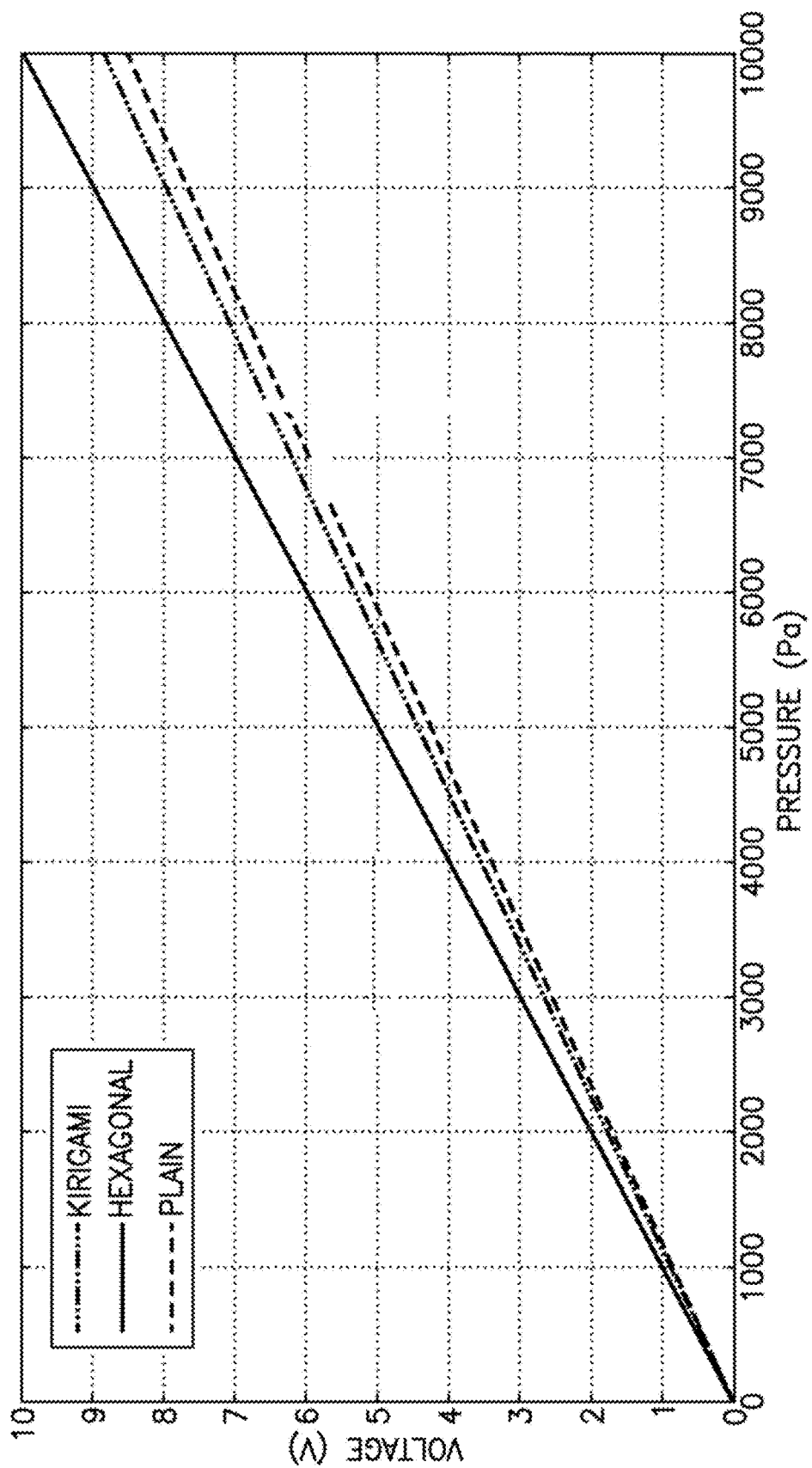
FIG. 14 is a graph of voltage output versus pressure for simulated pressure sensors having a plain membrane (dashed curve), a kirigami meta-membrane (dash-dot curve), and a hexagonal meta-membrane (solid curve).

Most micro-electromechanical systems (MEMS) require an appropriate sensitivity in a low-pressure regime, less than 10 kPa. Therefore, the simulation models were analyzed in a pressure range from 0 to 10 kPa. FIG. 14 is a graph of voltage output versus pressure for simulated pressure sensors having a plain membrane (dashed curve), a kirigami meta-membrane (dash-dot curve), and a hexagonal meta-membrane (solid curve). As a result, the voltage outputs for all models are increasing monotonically with pressure in FIG. 14.

To recognize the best simulation model, a voltage index (VI) was used to calculate a normalized voltage output with respect to the response of the simulated conventional pressure sensor (CPS) using the following formula:

$$VI = \frac{V_{MPS} - V_{CPS}}{V_{CPS}} \times 100 \qquad (1)$$

Table 5 shows normalized voltage outputs for the proposed MPS models at their resonance frequency and 10 kPa pressure amplitude of excitation. It was demonstrated that the MPS using the hexagonal honeycomb enables the simulated pressure sensor to generate the highest possible voltage with a voltage index equal to almost 10%.

TABLE 5

| Normalized voltage output of proposed MPS models | | |
|---|---|---|
| Type | $f_n$ (Hz) | VI (%) |
| Kirigami | 8388 | 1.33 |
| Hexagonal | 8458 | 9.64 |

Figure 15:
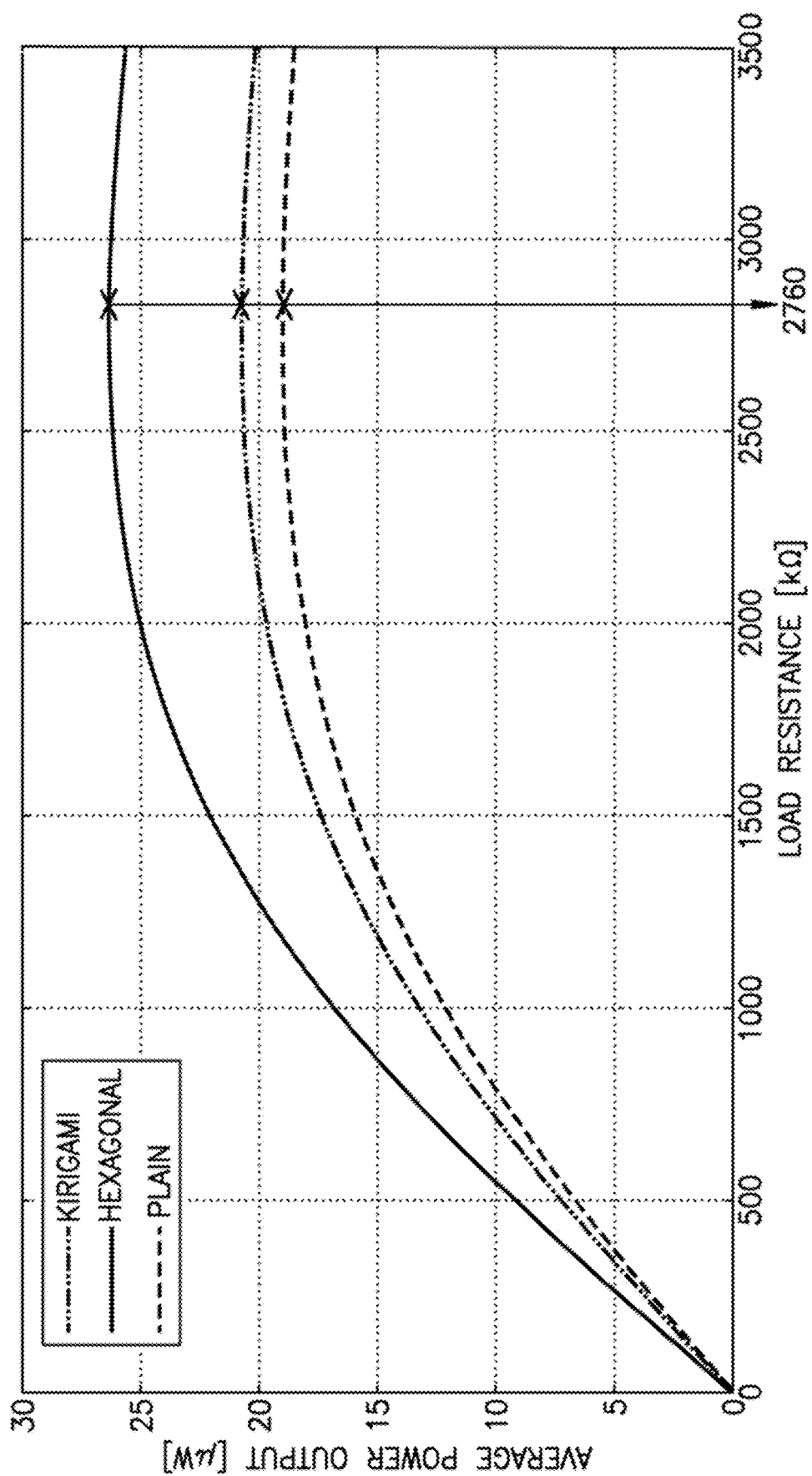
FIG. 15 is a graph of average power output versus load resistance for simulated pressure sensors having a plain membrane (dashed curve), a kirigami meta-membrane (dash-dot curve), and a hexagonal meta-membrane (solid curve).

To find the optimum load resistance of sensors for simulation analysis, the average power output of the CPS and MPSS as a function of the load resistance was simulated by applying pressure having an amplitude equal to 10 kPa. FIG. 15 is a graph of average power output versus load resistance for simulated pressure sensors having a plain membrane (dashed curve), a kirigami meta-membrane (dash-dot curve), and a hexagonal meta-membrane (solid curve).

Theoretically, the optimum load resistance $R_L$ matches the internal impedance $C_p$ of the piezoelectric element (Eq. (2)) and occurs at the maximum power output $P_{max}$ (Eq. (3)):

$$R_L = \frac{1}{2\pi f C_p} = \frac{t_p}{2\pi \varepsilon_{33} \varepsilon_0 A_p} \qquad (2)$$

$$P_{max} = \frac{f A_p t_p d_{31}^2}{\varepsilon_0 \varepsilon_{33}} (\overline{\sigma_{11}} + \overline{\sigma_{22}})^2 \qquad (3)$$

in which the parameters $\sigma_{11}$, $\sigma_{22}$, $\varepsilon_0$, and $A_p$ respectively denote longitudinal stress, transverse stress, permittivity of free space, and electrode area of the PVDF. As the simulation results show in FIG. 15, the maximum power output for the three models takes place at the load resistance of 2760 kΩ, which is similar to the theoretical optimum load resistance calculated using Eq. (2).

Figure 16:
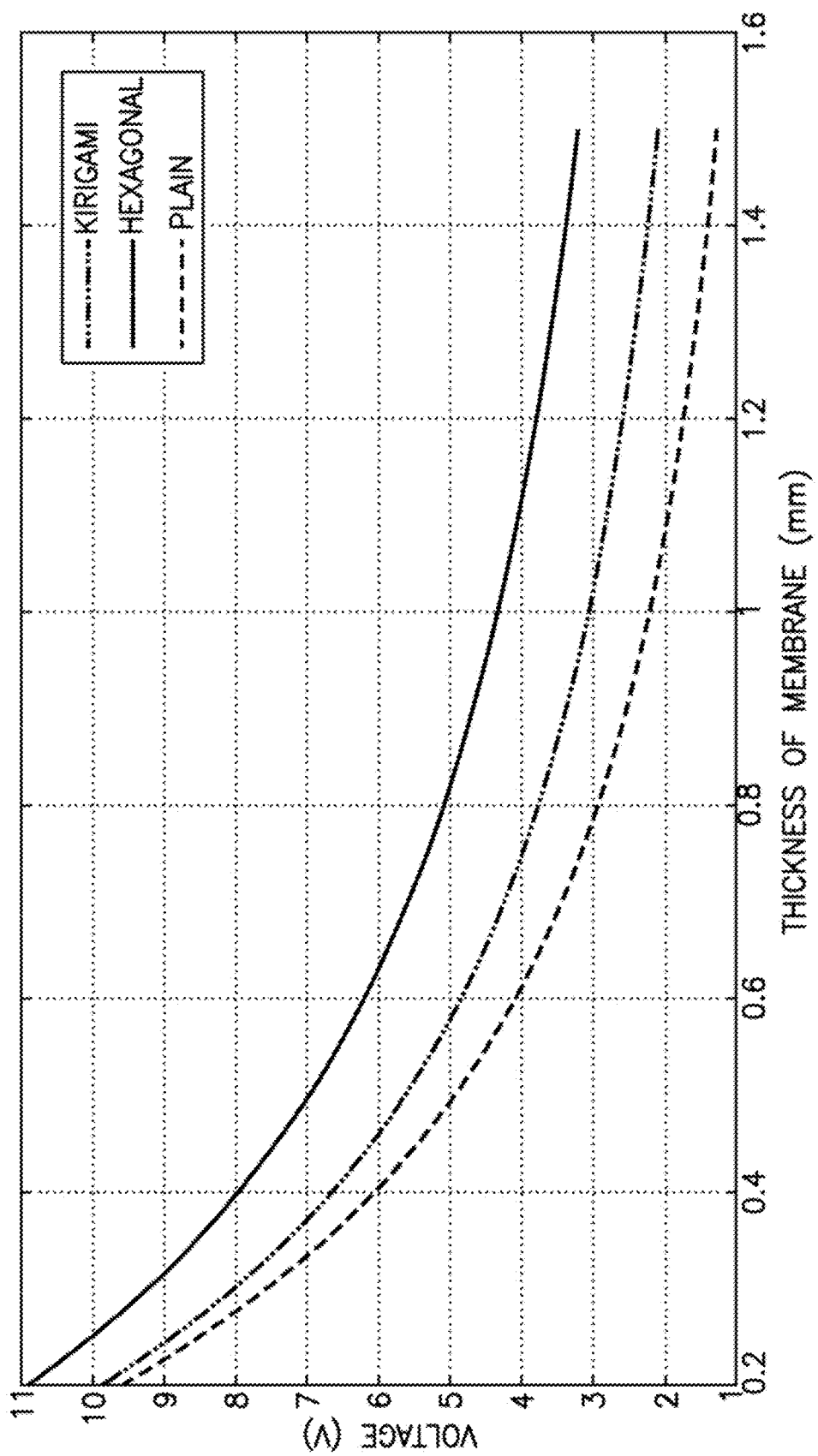
FIG. 16 is a graph of voltage output versus membrane thickness for simulated pressure sensors having a plain membrane (dashed curve), a kirigami meta-membrane (dash-dot curve), and a hexagonal meta-membrane (solid curve).

As a design study, simulations were performed to investigate the effect of the thicknesses of the plain membrane and two meta-membranes on the voltage output when the pressure sensors were actuated at a pressure of 10 kPa, optimum load resistance 2760 kΩ, and CPS resonance frequency 1648 Hz. FIG. 16 is a graph of voltage output versus thickness for simulated pressure sensors having a plain membrane (dashed curve), a kirigami meta-membrane (dash-dot curve), and a hexagonal meta-membrane (solid curve). The results showed that as the thickness of the membrane and meta-membranes increases, the voltage output of all three sensor models decreases, as shown in FIG. 16. This might be because the elastic energy from the substrate is transferred to the piezoelectric element by the membrane/meta-membranes, and therefore, when the thickness of the membrane/meta-membranes increases, more elastic energy is dissipated in the membrane/meta-membranes with a reduced strain energy transferred to the piezoelectric element.

Figure 17:
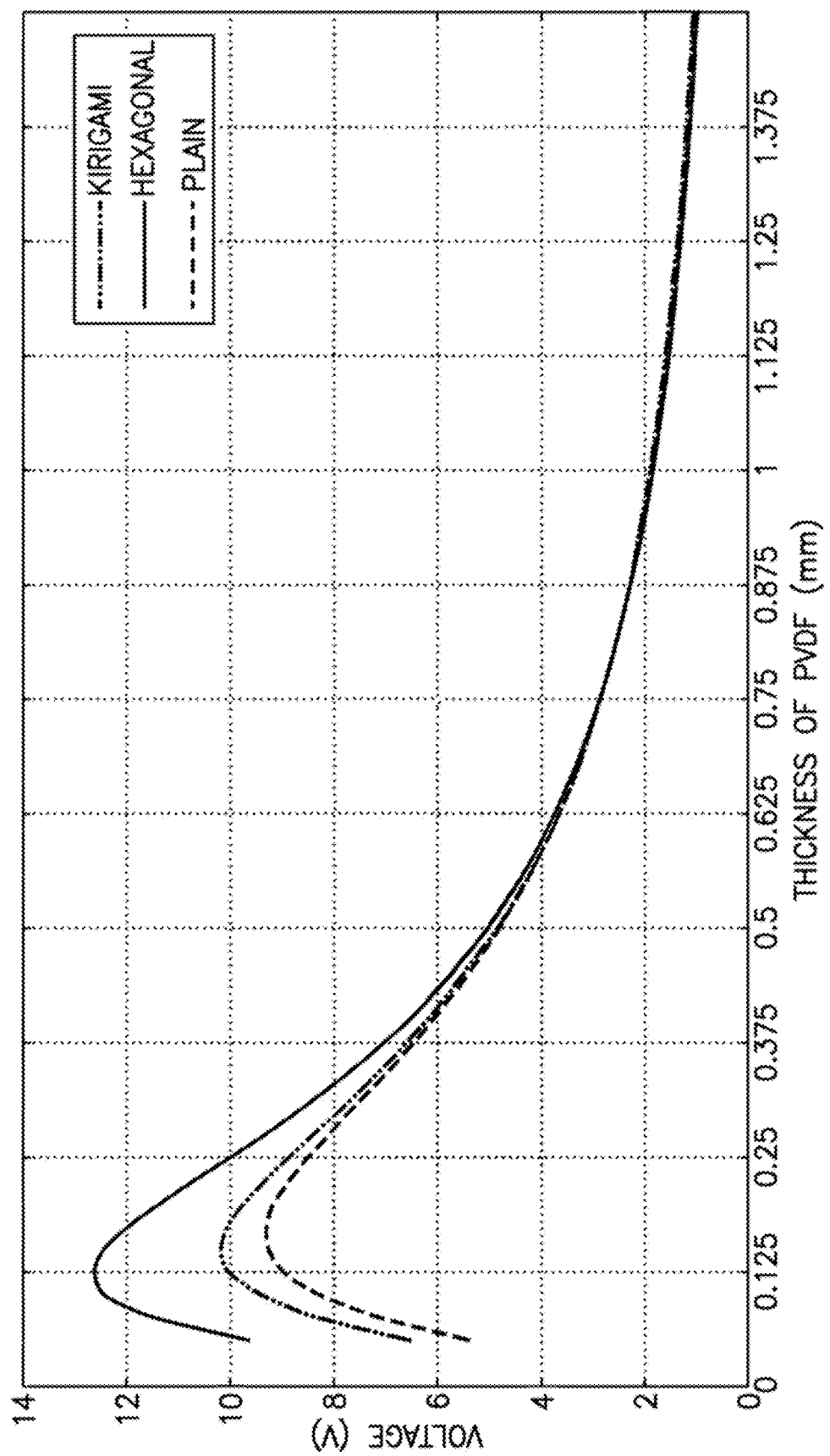
FIG. 17 is a graph of simulated voltage output versus thickness of a piezoelectric element attached to a plain membrane (dashed curve), a kirigami meta-membrane (dash-dot curve), and a hexagonal meta-membrane (solid curve).

The models were used to perform a further design investigation on the effect of the piezoelectric element thickness on the voltage output when the pressure sensors were actuated at a pressure of 10 kPa, optimum load resistance 2760 kΩ, and CPS resonance frequency 1648 Hz. FIG. 17 is a graph of simulated voltage output versus thickness of a PVDF piezoelectric element attached to a plain membrane (dashed curve), a kirigami meta-membrane (dash-dot curve), and a hexagonal meta-membrane (solid curve). The simulation results show that 125 μm, 150 μm, and 175 μm are the optimum piezoelectric element thickness for the hexagonal MPS, kirigami MPS, and CPS, respectively. Moreover, the auxetic MPS with the least thickness of the piezoelectric element can generate a best voltage output.

The ratio of the voltage output to the strain input is generally defined as the sensitivity of a sensor. To clarify, the membrane/meta-membrane is transferring strain energy to the piezoelectric element, which transfer is the primary cause of polarization in the piezoelectric element to generate voltage. Equation (4) was used to evaluate the significance of the membrane design on the sensor sensitivity $\mathcal{S}$:

$$\mathcal{S} = V/(\overline{\varepsilon_{11}} + \overline{\varepsilon_{22}})^2 \qquad (4)$$

in which the parameters $\overline{\varepsilon_{11}}$ and $\overline{\varepsilon_{22}}$ are the average longitudinal and transverse strain respectively of the membrane/meta-membrane. In this simulation, the sensitivities of the three models were investigated at the usable range of pressure amplitudes and frequencies. The optimum values calculated in the previous sections were used as the piezo-element thickness, load resistance, and membrane/meta-membrane thickness.

To predict a magnification factor for the proposed MPSs, their sensitivities were investigated for different excitation frequencies and amplitudes in which the thin cover film of the substrate was subjected to a bending movement caused by harmonic pressure, to produce an amplitude range of 1 to 10 kPa in a frequency range of 1648 to 2472 Hz.

Figure 18:
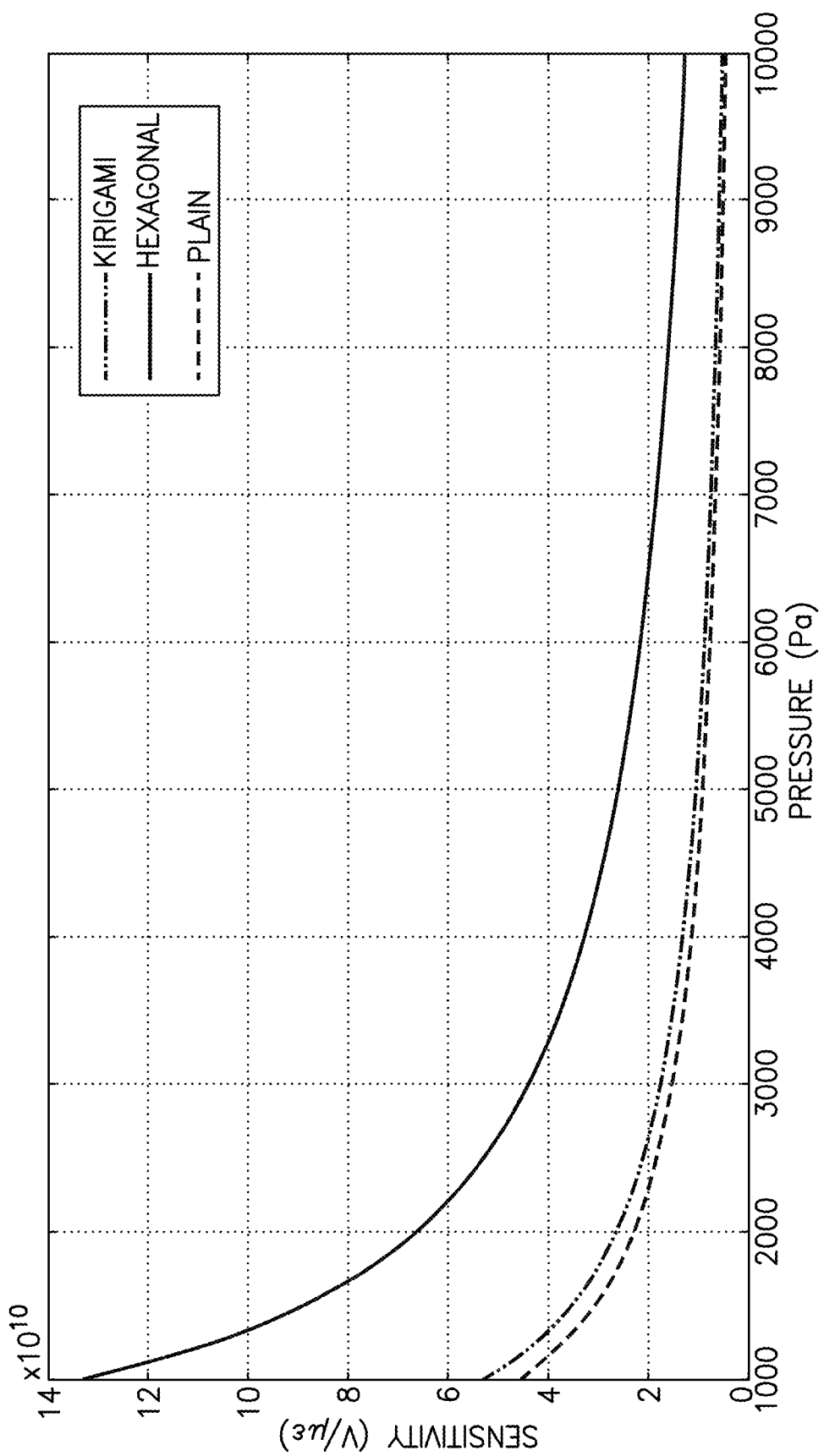
FIG. 18 is a graph of the sensitivity performance versus pressure for the three simulated pressure sensors.
Figure 19:
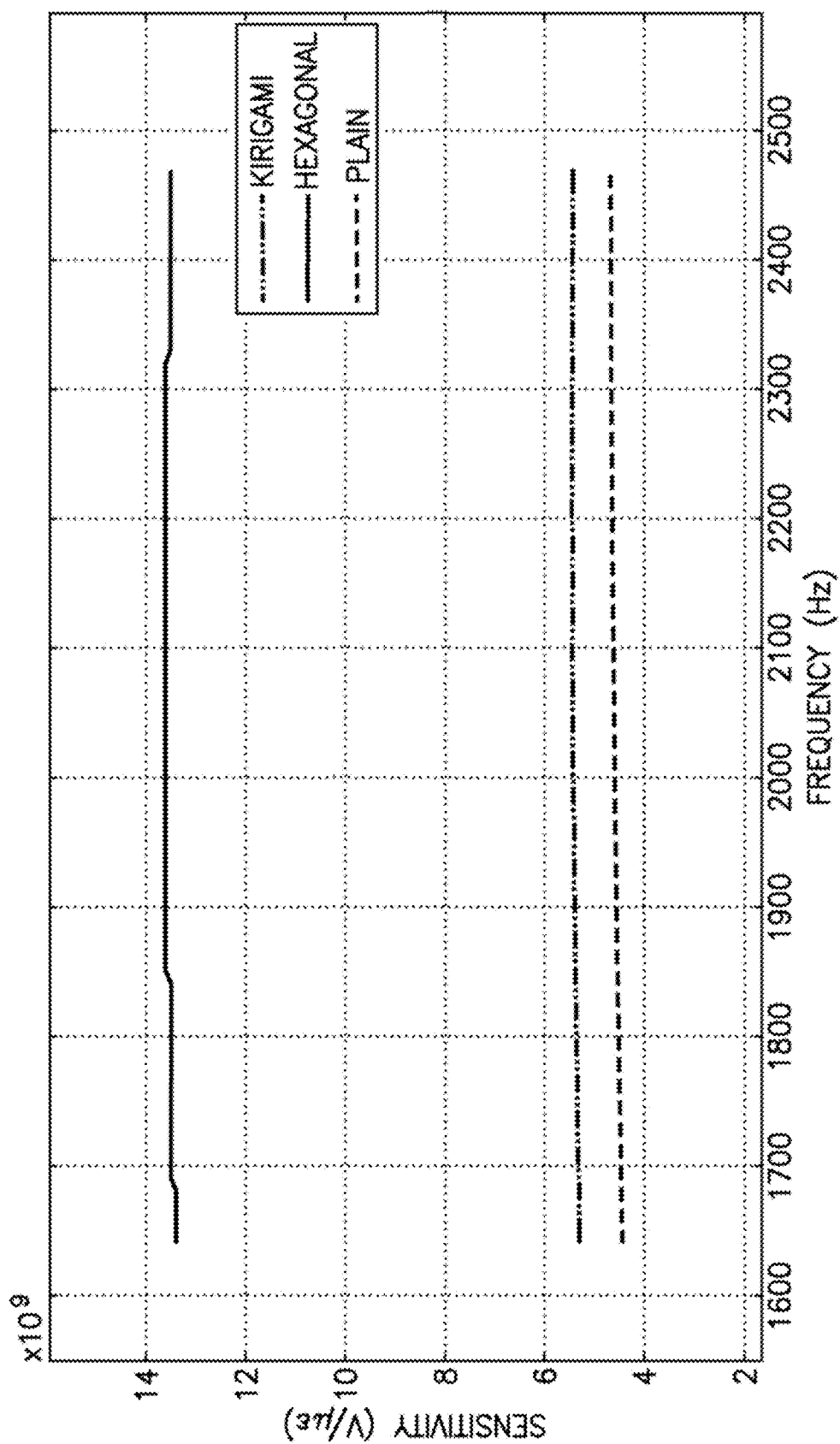
FIG. 19 is a graph of the sensitivity performance versus frequency for the three simulated pressure sensors.

FIGS. 18 and 19 are graphs respectively showing the effects of pressure and frequency on sensitivity for the three simulated pressure sensors as determined using finite element analysis. When the frequency was varied, the pressure amplitude was kept constant at 10 kPa (FIG. 19). Similarly, the applied frequency was kept constant at 1648 Hz when the pressure amplitude was varied (FIG. 18). The sensitivity of the three models decreases with increasing pressure amplitude as seen in FIG. 18. In addition, the sensitivity remains constant when the frequency changes between 0.2 $f_n$ and 0.3 $f_n$ as seen in FIG. 19. In both figures, the sensitivities of the MPSs which respectively use the auxetic hexagonal and kirigami meta-membranes were much better compared to an equivalent CPS using a plain membrane.

A comparison ratio of $\zeta$ was defined in the following equation as the sensitivity gain factor in order to evaluate the sensitivity performance of the MPSs as compared to the CPS:

$$\zeta = \frac{S_{MPS}}{S_{CPS}} \quad (5)$$

The simulations demonstrated that the magnification factor for the hexagonal and kirigami MPSs can reach up to 2.97 and 1.17, respectively. The simulation results also proved that the sensitivity gain factor remains constant across different pressure amplitudes, which means the magnification factor is a function of the membrane/meta-membrane geometry of the sensors and is not dependent on the excitation conditions. In order to explore the reasons for such remarkable sensitivity enhancement and different reactions to an identical excitation, first the stress distribution across the piezoelectric element layer was calculated, and then the strain responses of the plain membrane and two meta-membranes were investigated and compared.

According to the sensitivity definition represented by Eq. (4), the sensitivity of a pressure sensor depends on the stretchability of its membrane and the voltage generated by its piezoelectric element. Hence, to investigate the performance of the three sensor models, a simulation was performed with regards to the membrane/meta-membrane and piezoelectric element. To this end, COMSOL Multiphysics 3.5a software was used to interpret the meta-membrane performance in sensitivity enhancement when a sinusoidal pressure was applied on the surface of the substrate's cover along the Z axis at a pressure amplitude of 10 kPa and a frequency of 1648 Hz. The optimum thickness values calculated by the finite element analysis were used for the piezoelectric elements. In addition, the optimum load resistance, 2760 k$\Omega$, was used for this evaluation. The thicknesses of the plain membrane and two meta-membranes were all assumed to be 0.25 mm.

The simulation results showed that the MPSs present a better displacement along the Z axis as compared to the CPS. For the pressure sensors, the voltage output is made by the piezoelectric element polarization along the Z axis and was proportional to the optimal power output (Eq. (6)):

$$V_{RMS} = \sqrt{R_L P_{opt}} \quad (6)$$

The root mean square (RMS) of the voltage output can then be obtained by substituting Eqs. (2) and (3) into Eq. (6):

$$V_{RMS} = \frac{t_p d_{31}}{\varepsilon^T}(\overline{\sigma_{11}} + \overline{\sigma_{22}}) \quad (7)$$

Equation (7) shows that the voltage output is related to the sum of the axial and lateral stress tensors for the sensor's piezoelectric element. Table 6 summarizes the voltage output and stress of the piezoelectric elements for all simulated models. The results demonstrated that the simulated MPSs with a meta-membrane generated more voltage compared to the simulated CPS with a plain membrane. To investigate the positive impact of the meta-membrane mechanism on the voltage increase, the stress distribution across the piezoelectric element layer was also examined for the three simulated sensors with results listed in Table 6.

TABLE 6

| Voltage output and longitudinal and transverse stresses | | | |
|---|---|---|---|
| Design | $\overline{\sigma_{11}}$, MPa | $\overline{\sigma_{22}}$, MPa | $V_{RMS}$, V |
| Hexagonal | 0.557 | 0.582 | 13.74 |
| Kirigami | 0.399 | 0.417 | 11.33 |
| Plain | 0.335 | 0.350 | 10.61 |

The simulation results revealed that most of the piezoelectric element's surface area for the two MPSs experiences a higher level of stress as compared to the CPS. As the piezoelectric element's polarization and stretching stress are made by the expansion reaction of the membrane/meta-membrane, to find the reason why the MPSs generated more voltage, the planar stretchability of the membrane/meta-membranes was examined.

The simulation revealed that the MPSs have greater displacement along the Z axis as compared to the CPS. Most of the area of the piezoelectric element's surface of the two simulated MPSs experienced a higher level of stress. Peak stresses of 6.64 MPa, 4.98 MPa, and 4.56 MPa were respectively observed in the hexagonal MPS, kirigami MPS, and CPS, which values were all sufficiently below the yield strength of both PVDF and polycarbonate (30-80 MPa). From a structural standpoint, the displacement of a pressure along the Z axis is mostly caused by expansion of the membrane/meta-membrane in other directions ($\varepsilon_{11}$ and $\varepsilon_{22}$). Since an auxetic design inherently enables structures to stretch more, one would expect the two auxetic hexagonal and kirigami honeycombs to provide the MPSs with a stretchability that is greater than that of the plain membrane. The maximum longitudinal and transverse strains for the three simulated models are tabulated in Table 7. As a result, the auxetic hexagonal and kirigami metamaterials demonstrated remarkable planar strain values.

TABLE 7

| Longitudinal and transverse strains | | |
|---|---|---|
| Design | $\varepsilon_{11}$, $\mu\varepsilon$ | $\varepsilon_{22}$, $\mu\varepsilon$ |
| Hexagonal | 468 | 475 |
| Kirigami | 228 | 236 |
| Plain | 188 | 194 |

The displacement fields of the simulated metamaterials were severely distorted by the auxetic hexagonal and kirigami honeycombs. The two proposed honeycombs help the stretchable meta-membranes to have a better stretchability that transfers the strain energy of the applied excitation to the piezoelectric element.

Figure 20:
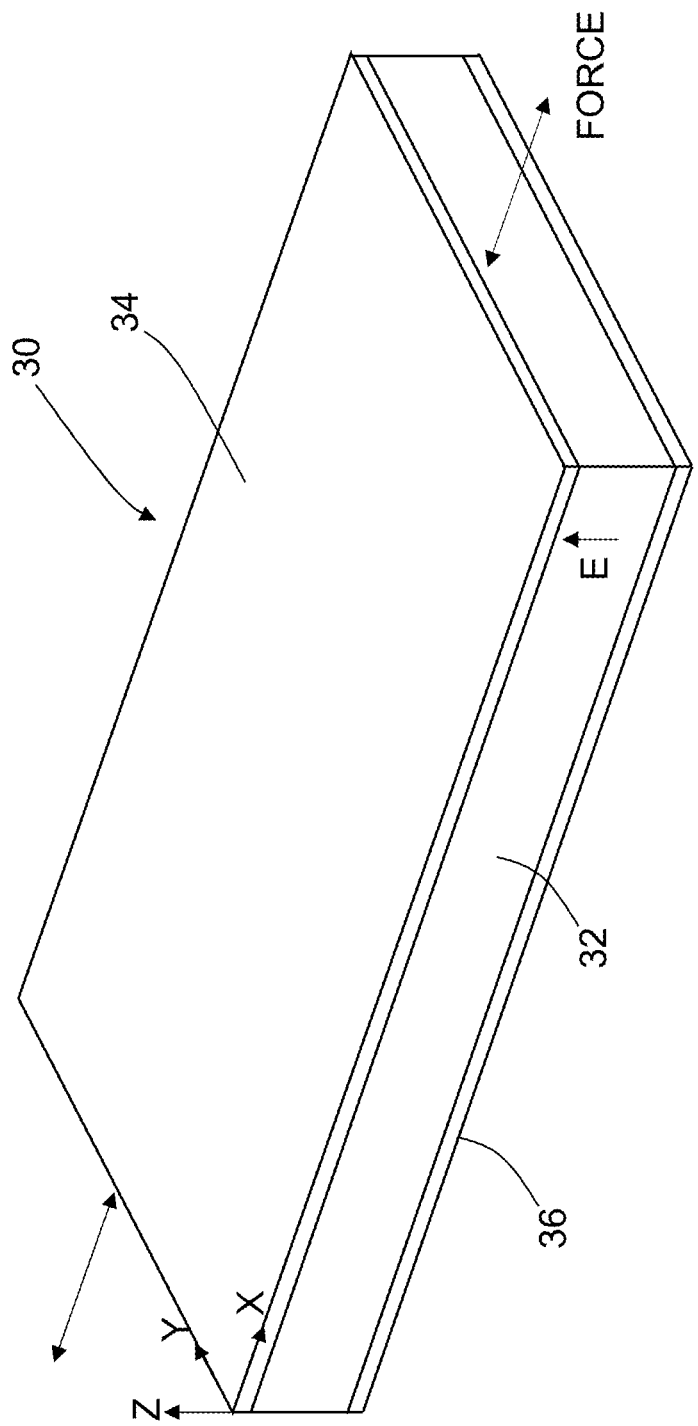
FIG. 20 is a diagram representing a 3-D view of a piezoelectric element. The double-headed arrows indicate a tensile or compressive force being applied to opposing ends of the piezoelectric element in a direction parallel to the X axis.

FIG. 20 is a diagram representing a 3-D view of a piezoelectric element 30. The piezoelectric element 30 includes a piezoelectric substrate 32 sandwiched between a pair of electrodes 34 and 36. The piezoelectric substrate 32 is made of a piezoelectric material; the electrodes 34 and 36 are made of electrically conductive material. The double-headed arrows in FIG. 20 indicate a tension or compression force being applied to opposing ends of the piezoelectric element 30 in a direction parallel to the X axis. One suitable piezoelectric material is PVDF.

Figure 21:
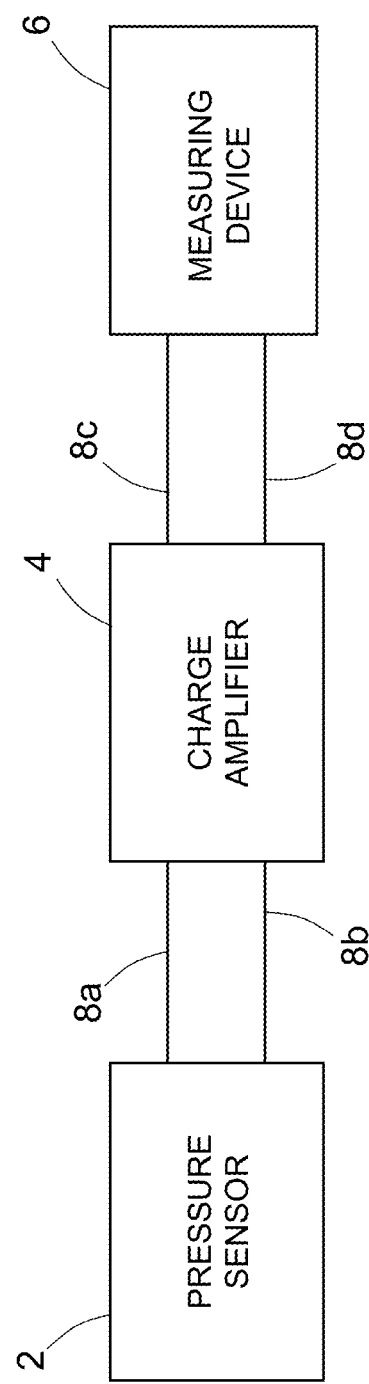
FIG. 21 is a block diagram identifying components of a pressure measuring system that may employ one of the meta-membrane piezoelectric pressure sensors disclosed herein.

FIG. 21 is a block diagram identifying components of a pressure measuring system 28 that includes a pressure sensor 2, a charge amplifier 4, and a measuring device 6. The pressure sensor 2 includes a piezoelectric element 30 (see FIG. 20) attached to one of the meta-membranes disclosed herein. The electrodes 32 and 34 of the piezoelectric element 30 are electrically connected to respective input terminals of charge amplifier 4 via a pair of electrical conductors 8a and 8b. The output terminals of charge amplifier 4 are electrically connected to respective input terminals of measuring device 6 via a pair of electrical conductors 8c and 8d. The electrical conductors may be wires, metallic traces on a flexible circuit, or other electrically conductive members.

The measuring device 6 may include an analog-to-digital converter that converts analog electrical signals received from charge amplifier 4 into digital electrical signals and a data processor that is configured (e.g., a programmed microcontroller) to convert the digital electrical signals into digital data representing a pressure measurement (for example, using a lookup table). The digital data may be sent to a pressure gauge via a data distribution network (not shown in FIG. 21). The pressure gauge may take the form of a cockpit display device having a display processor programmed to display the measurement results graphically and/or alphanumerically on a display screen for viewing by a pilot on the flight deck of an aircraft.

The pressure sensor 2 may be disposed on a surface of a test member for measuring the pressure exerted on the test member. The test member may be an airfoil, in which case the pressure sensor 2 can be used to detect the pressure on the airfoil during operation of the airfoil in a wind tunnel, during flight, or otherwise. The pressure sensor 2 can alternatively be used to determine the pressure on other test members such as a surface of an automobile or other air, land, or water vehicle, a surface of a building, bridge, or road surface, a surface of detection or communication equipment, and the like. The pressure sensor 2 may be disposed and operated individually or in an array for testing the pressure over an area of a surface.

It should be appreciated that the shape of the footprint of the pressure sensor proposed herein is not limited to the footprint shape adopted for the purpose of the above-described simulations. For example, instead of a square or rectangular outer perimeter, the substrate may have a circular outer perimeter. Regardless of the shape of the footprint of the substrate, the meta-membrane preferably has a footprint with a shape that matches the shape and an area that is larger than the area of the footprint of the piezoelectric element.

Also, the support frame and cover film of the substrate may be, but need not be integrally formed. Instead, the outer periphery of an independently fabricated cover film may be glued to the support frame, in which case the cover film and support frame may be made of different materials. For example, the cover film may be made of polycarbonate, while the support frame is made of metallic, plastic (other than polycarbonate), or fiber-reinforced plastic material.

While piezoelectric sensors having an auxetic meta-membrane coupled to a piezoelectric element have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore, it is intended that the claims not be limited to the particular embodiments disclosed herein.

The invention claimed is:

1. A piezoelectric sensor comprising:
    a substrate comprising a support frame which laterally surrounds and partly defines a recess and a cover film which overlies and partly defines the recess, wherein the support frame supports the cover film along an entire periphery of the cover film;
    a meta-membrane which is adhered to the cover film of the substrate; and
    a piezoelectric element which is adhered to the meta-membrane.

2. The piezoelectric sensor as recited in claim 1, wherein the meta-membrane has an auxetic kirigami honeycomb structure.

3. The piezoelectric sensor as recited in claim 1, wherein the meta-membrane comprises a perforated sheet of flexible material having a first plurality of mutually parallel elongated narrow openings and a second plurality of mutually parallel elongated narrow openings, the first plurality of mutually parallel elongated narrow openings being orthogonal to the second plurality of mutually parallel elongated narrow openings when the perforated sheet is in an unflexed state.

4. The piezoelectric sensor as recited in claim 3, wherein the perforated sheet of the meta-membrane comprises a plurality of rectangular domains and a plurality of flexural hinges, wherein each flexural hinge connects one rectangular domain to an adjacent rectangular domain.

5. The piezoelectric sensor as recited in claim 4, wherein each flexural hinge is disposed between an elongated narrow opening of the first plurality of mutually parallel elongated narrow openings and one end of an elongated narrow opening of the second plurality of mutually parallel elongated narrow openings.

6. The piezoelectric sensor as recited in claim 4, wherein each rectangular domain is square and each flexural hinge is square.

7. The piezoelectric sensor as recited in claim 1, wherein the meta-membrane has an auxetic hexagonal honeycomb structure.

8. The piezoelectric sensor as recited in claim 1, wherein the meta-membrane comprises an outer frame that supports a network of hexagonal cells, wherein each hexagonal cell comprises a deformable hexagonal frame that defines a six-sided polygonal opening which has a bowtie shape when the hexagonal cell is in an unflexed state.

9. The piezoelectric sensor as recited in claim 8, wherein the deformable hexagonal frame comprises first and second walls and first and second flexible structures which connect the first wall to the second wall, wherein:
    the first flexible structure comprises a first flexural element integrally connected to the first wall by a first flexural hinge and a second flexural element integrally connected to the second wall by a second flexural hinge;
    the second flexible structure comprises a third flexural element integrally connected to the first wall by a third flexural hinge and a fourth flexural element integrally connected to the second wall by a fourth flexural hinge;
    the first and second flexural elements are integrally connected to each other by a fifth flexural hinge; and
    the third and fourth flexural elements are integrally connected to each other by a sixth flexural hinge.

10. The piezoelectric sensor as recited in claim 1, further comprising first elastic glue which adheres the meta-membrane to the substrate and second elastic glue which adheres the piezoelectric element to the meta-membrane.

11. The piezoelectric sensor as recited in claim 1, wherein the substrate and meta-membrane are made of polycarbonate and the piezoelectric element comprises a piezoelectric substrate made of polyvinylidene fluoride.

12. A pressure measuring system comprising a pressure sensor, a charge amplifier electrically coupled to the pressure sensor, and a measuring device electrically coupled to the charge amplifier, wherein the pressure sensor comprises:
- a substrate comprising a support frame which laterally surrounds and partly defines a recess and a cover film which overlies and partly defines the recess, wherein the support frame supports the cover film along an entire periphery of the cover film;
- a meta-membrane which is adhered to the cover film of the substrate, wherein the meta-membrane has an auxetic kirigami honeycomb structure; and
- a piezoelectric element which is adhered to the meta-membrane.

13. The pressure measuring system as recited in claim 12, wherein the meta-membrane comprises a perforated sheet of flexible material having a first plurality of mutually parallel elongated narrow openings and a second plurality of mutually parallel elongated narrow openings, the first plurality of mutually parallel elongated narrow openings being orthogonal to the second plurality of mutually parallel elongated narrow openings when the perforated sheet is in an unflexed state.

14. The pressure measuring system as recited in claim 13, wherein the perforated sheet of the meta-membrane comprises a plurality of rectangular domains and a plurality of flexural hinges, wherein each flexural hinge connects one rectangular domain to an adjacent rectangular domain.

15. The pressure measuring system as recited in claim 14, wherein each flexural hinge is disposed between an elongated narrow opening of the first plurality of mutually parallel elongated narrow openings and one end of an elongated narrow opening of the second plurality of mutually parallel elongated narrow openings.

16. The pressure measuring system as recited in claim 14, wherein each rectangular domain is square and each flexural hinge is square.

17. The pressure measuring system as recited in claim 12, further comprising first elastic glue which adheres the meta-membrane to the substrate and second elastic glue which adheres the piezoelectric element to the meta-membrane.

18. A pressure measuring system comprising a pressure sensor, a charge amplifier electrically coupled to the pressure sensor, and a measuring device electrically coupled to the charge amplifier, wherein the pressure sensor comprises:
- a substrate comprising a support frame which laterally surrounds and partly defines a recess and a cover film which overlies and partly defines the recess, wherein the support frame supports the cover film along an entire periphery of the cover film;
- a meta-membrane which is adhered to the cover film of the substrate, wherein the meta-membrane has an auxetic hexagonal honeycomb structure; and
- a piezoelectric element which is adhered to the meta-membrane.

19. The pressure measuring system as recited in claim 18, wherein the meta-membrane comprises an outer frame that supports a network of hexagonal cells, wherein each hexagonal cell comprises a deformable hexagonal frame that defines a six-sided polygonal opening which has a bowtie shape when the hexagonal cell is in an unflexed state.

20. The pressure measuring system as recited in claim 19, wherein the deformable hexagonal frame comprises first and second walls and first and second flexible structures which connect the first wall to the second wall, wherein:
- the first flexible structure comprises a first flexural element integrally connected to the first wall by a first flexural hinge and a second flexural element integrally connected to the second wall by a second flexural hinge;
- the second flexible structure comprises a third flexural element integrally connected to the first wall by a third flexural hinge and a fourth flexural element integrally connected to the second wall by a fourth flexural hinge;
- the first and second flexural elements are integrally connected to each other by a fifth flexural hinge; and
- the third and fourth flexural elements are integrally connected to each other by a sixth flexural hinge.

\* \* \* \* \*